United States Patent
Tsukioka

(10) Patent No.: US 8,259,202 B2
(45) Date of Patent: Sep. 4, 2012

(54) IMAGE PROCESSING DEVICE AND IMAGE PROCESSING PROGRAM FOR ACQUIRING SPECIFIC COLOR COMPONENT BASED ON SENSITIVITY DIFFERENCE BETWEEN PIXELS OF AN IMAGING DEVICE

(75) Inventor: Taketo Tsukioka, Hachioji (JP)

(73) Assignee: Olympus Corporation, Tokyo (JP)

( * ) Notice: Subject to any disclaimer, the term of this patent is extended or adjusted under 35 U.S.C. 154(b) by 721 days.

(21) Appl. No.: 11/596,207

(22) PCT Filed: May 10, 2005

(86) PCT No.: PCT/JP2005/008827
§ 371 (c)(1),
(2), (4) Date: Jun. 15, 2007

(87) PCT Pub. No.: WO2005/112470
PCT Pub. Date: Nov. 24, 2005

(65) Prior Publication Data
US 2008/0043115 A1 Feb. 21, 2008

(30) Foreign Application Priority Data
May 13, 2004 (JP) .................................. 2004-143128

(51) Int. Cl.
H04N 3/14 (2006.01)
H04N 5/335 (2011.01)
H04N 9/04 (2006.01)
(52) U.S. Cl. ................. 348/273; 382/254; 348/222.1
(58) Field of Classification Search .................. 348/272, 348/273, 222.1; 382/280, 282, 300, 299, 382/254, 272, 274, 162, 167
See application file for complete search history.

(56) References Cited

U.S. PATENT DOCUMENTS

| 5,552,827 | A | 9/1996 | Maenaka et al. |
| 5,629,734 | A | 5/1997 | Hamilton, Jr. et al. |
| 6,563,538 | B1 * | 5/2003 | Utagawa ........................ 348/273 |
| 7,079,705 | B2 * | 7/2006 | Zhang et al. ................... 382/280 |
| 7,084,905 | B1 * | 8/2006 | Nayar et al. ................ 348/222.1 |
| 2003/0160875 | A1 * | 8/2003 | Mitsunaga et al. ......... 348/222.1 |

FOREIGN PATENT DOCUMENTS

| JP | 7-236147 A | 9/1995 |
| JP | 8-298669 A | 11/1996 |
| JP | 2003-230158 A | 8/2003 |

* cited by examiner

Primary Examiner — Nelson D. Hernández Hernández
(74) Attorney, Agent, or Firm — Holtz, Holtz, Goodman & Chick, PC

(57) ABSTRACT

In a high precision image processor and image processing program, an output of a one-chip Bayer array CCD is A/D converted and noise reduced, and then entered in a G interpolation circuit which comprises interpolation circuit B which implements interpolation processing of a less resolving power but does not reflect on the result of interpolation an apparent sensitivity difference occurring at a pixel value of a G pixel of the one-chip CCD, and interpolation circuit A which implements interpolation processing of an improved resolving power but reflects an apparent sensitivity difference on the result of interpolation. G interpolation circuit estimates a sensitivity difference at a pixel of interest and combines outputs of interpolation circuits A and B such that for a large sensitivity difference, the output of circuit B is used more, and for a small sensitivity difference, the output of circuit A is used more.

21 Claims, 23 Drawing Sheets

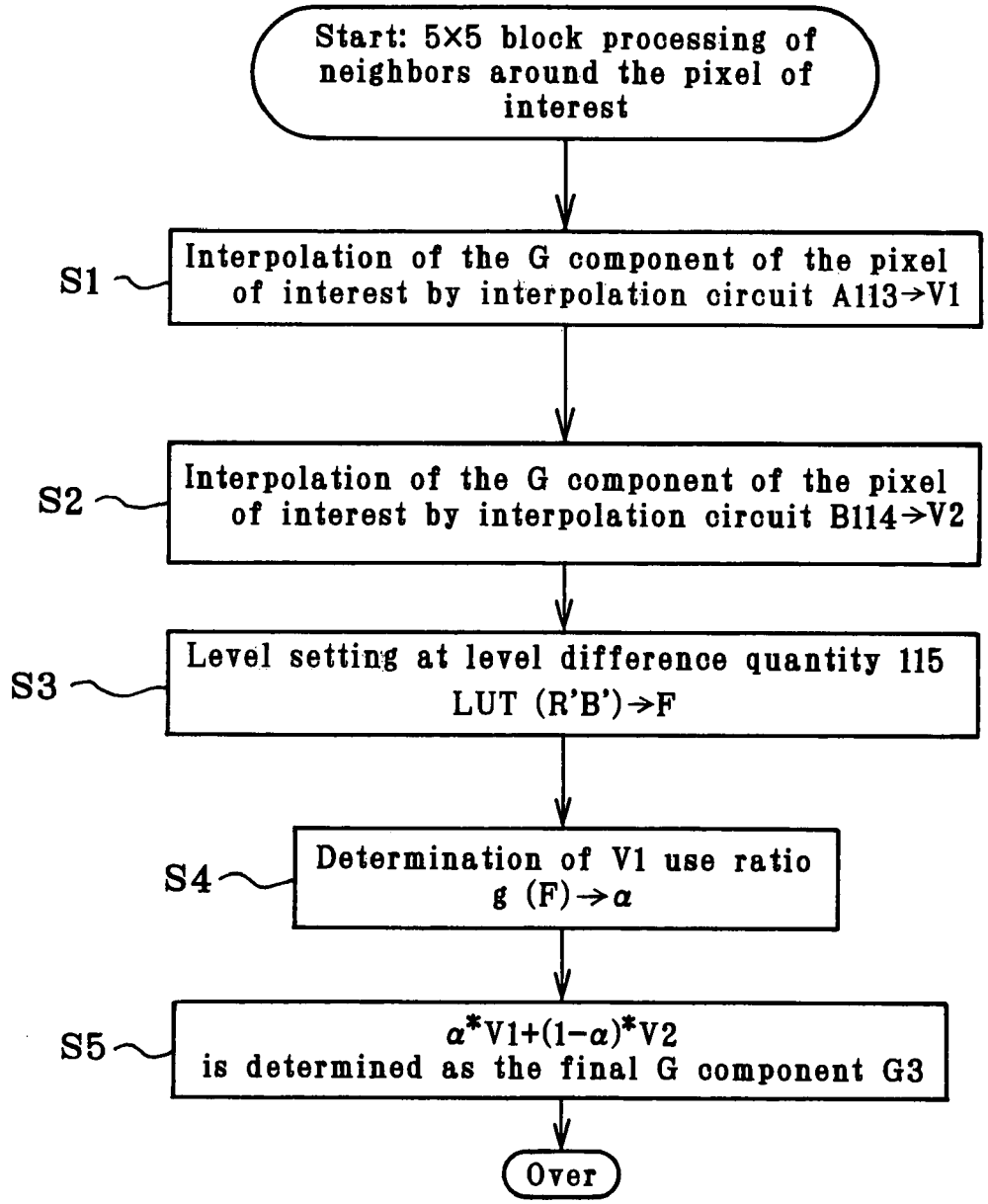

FIG. 8(a)

| R | G | R | G | R |
|---|---|---|---|---|
| G | B | G | B | G |
| R | G | R | G | R |
| G | B | G | B | G |
| R | G | R | G | R |

Color component obtained
at the center pixel
=R

FIG. 8(b)

| G | R | G | R | G |
|---|---|---|---|---|
| B | G | B | G | B |
| G | R | G | R | G |
| B | G | B | G | B |
| G | R | G | R | G |

Color component obtained
at the center pixel
=G

FIG. 9(a)

| R |   | R |   | R |
|---|---|---|---|---|
|   | B |   | B |   |
| R |   | R |   | R |
|   | B |   | B |   |
| R |   | R |   | R |

| G | G | G | G | G |
|---|---|---|---|---|
| G | G | G | G | G |
| G | G | G | G | G |
| G | G | G | G | G |
| G | G | G | G | G |

| R |   | R |   | R |
|---|---|---|---|---|
|   |   |   |   |   |
| R |   | R |   | R |
|   |   |   |   |   |
| R |   | R |   | R |

|   |   |   |   |   |
|---|---|---|---|---|
|   | B |   | B |   |
|   |   |   |   |   |
|   | B |   | B |   |
|   |   |   |   |   |

| G |   | G |   | G |
|---|---|---|---|---|
|   |   |   |   |   |
| G |   | G |   | G |
|   |   |   |   |   |
| G |   | G |   | G |

|   |   |   |   |   |
|---|---|---|---|---|
|   | G |   | G |   |
|   |   |   |   |   |
|   | G |   | G |   |
|   |   |   |   |   |

YB

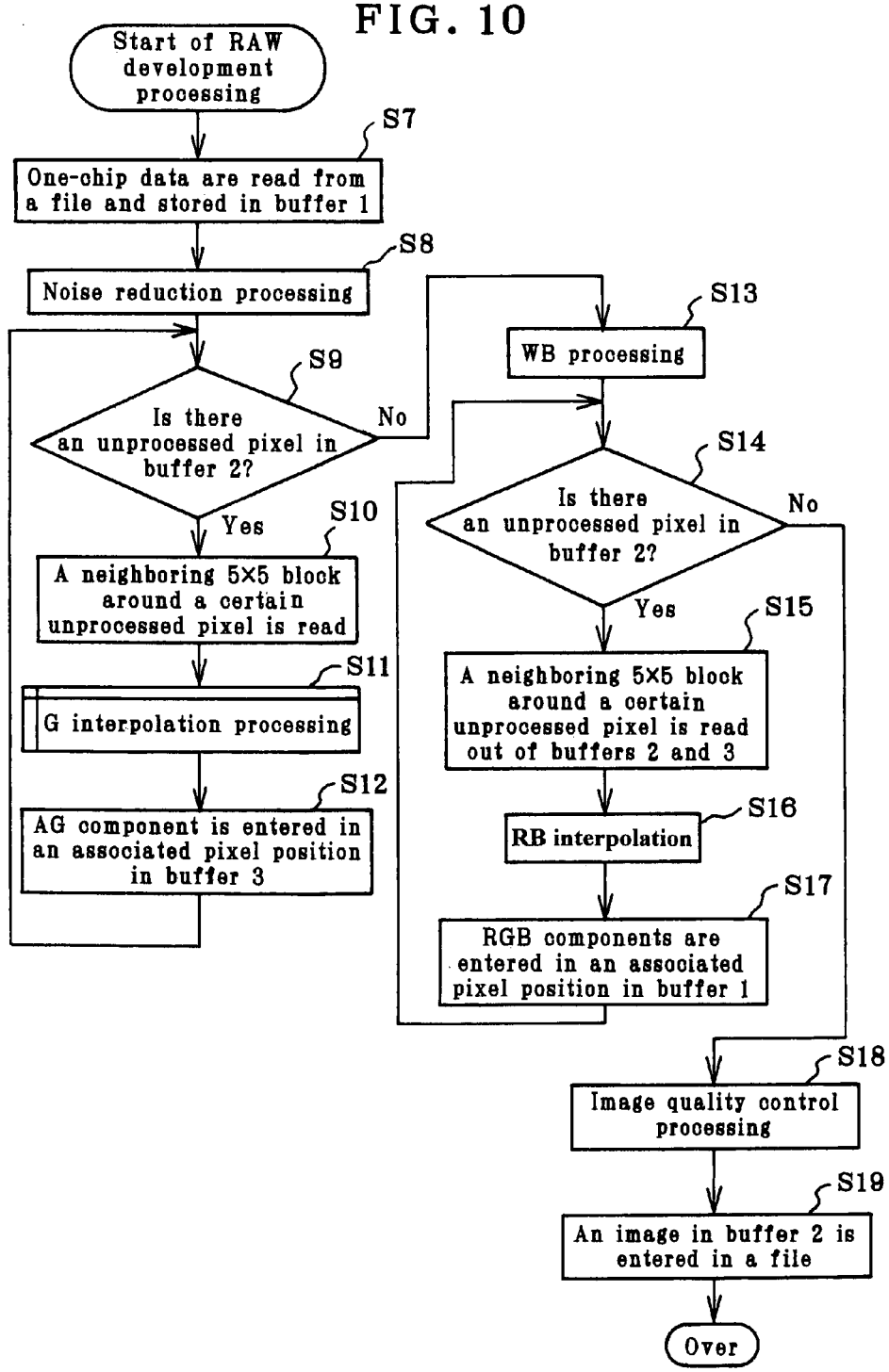

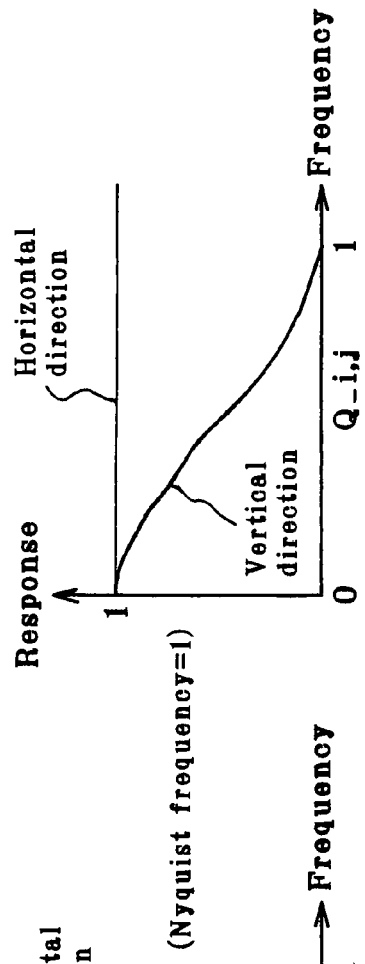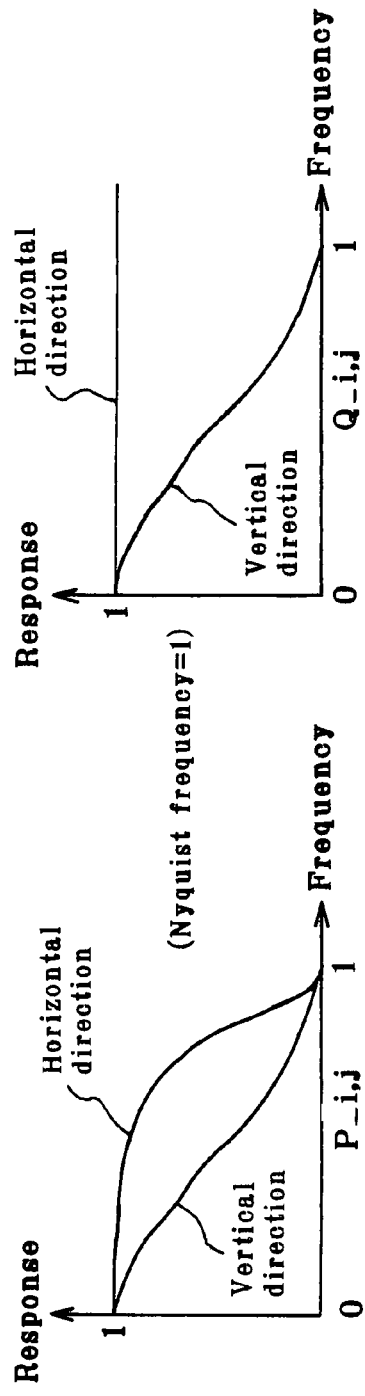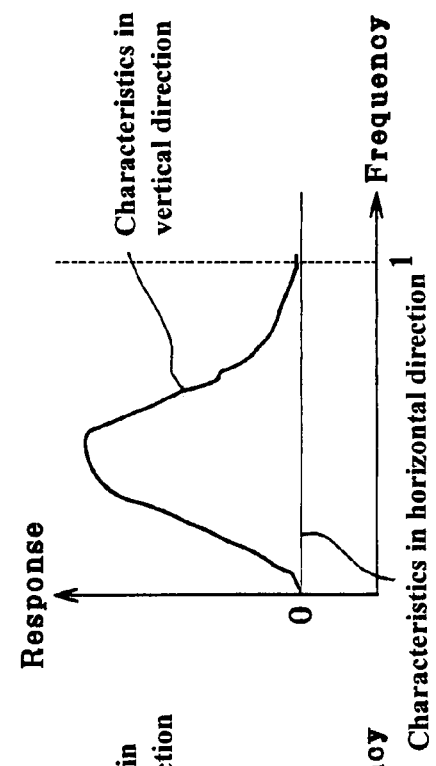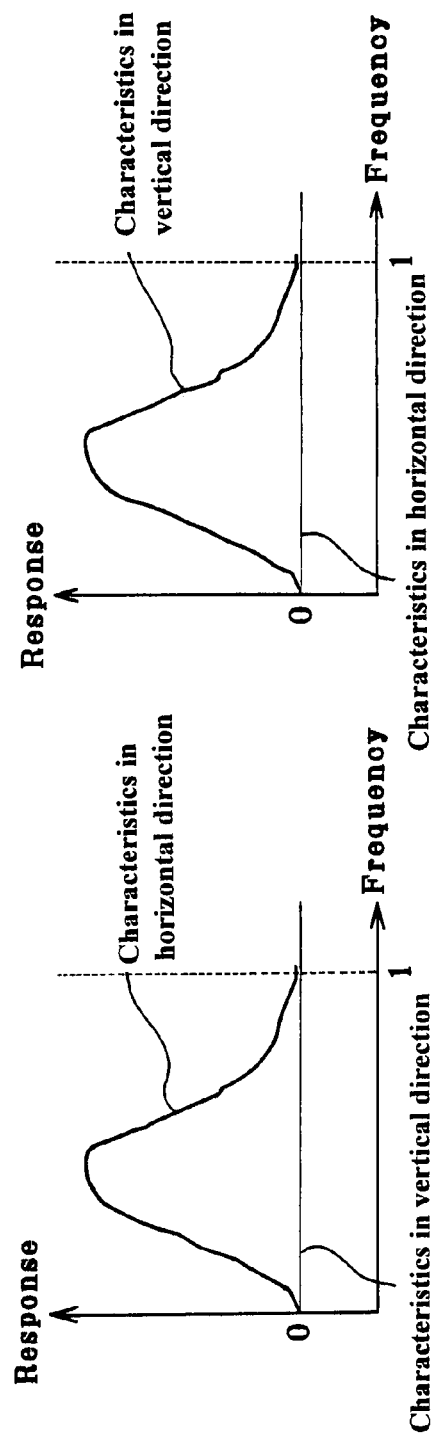

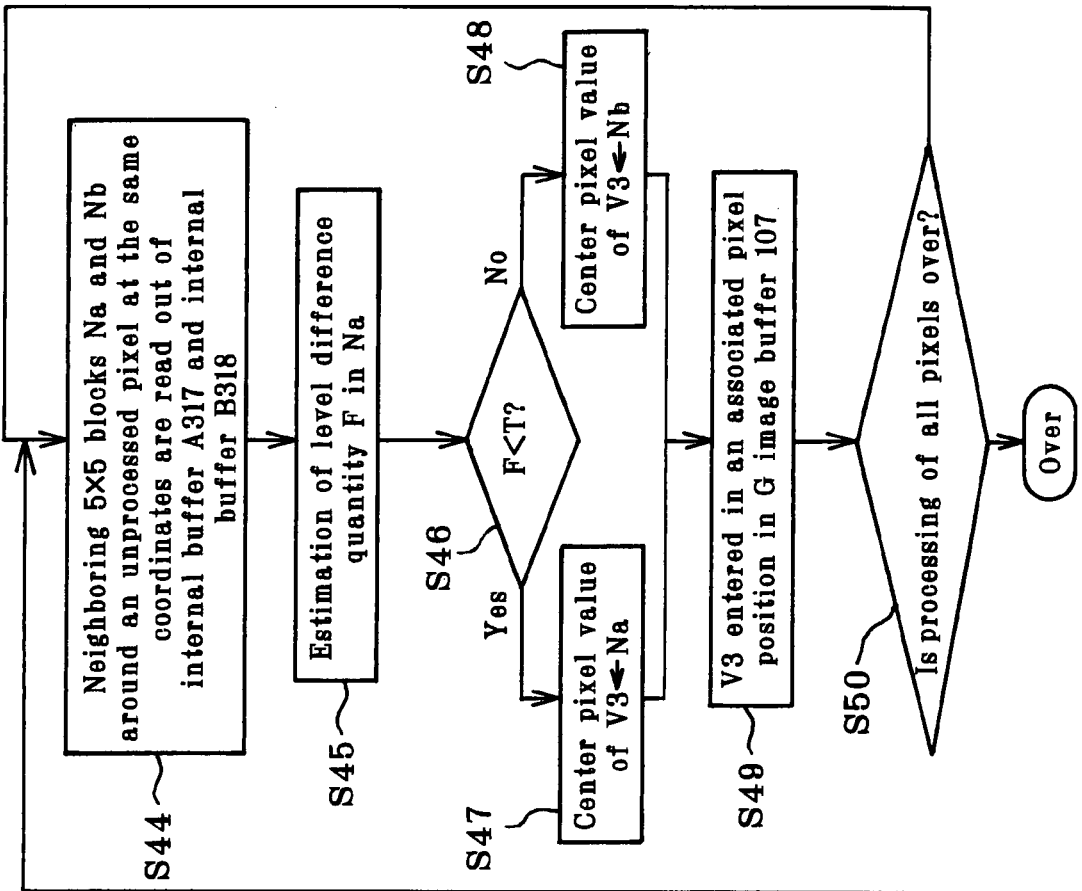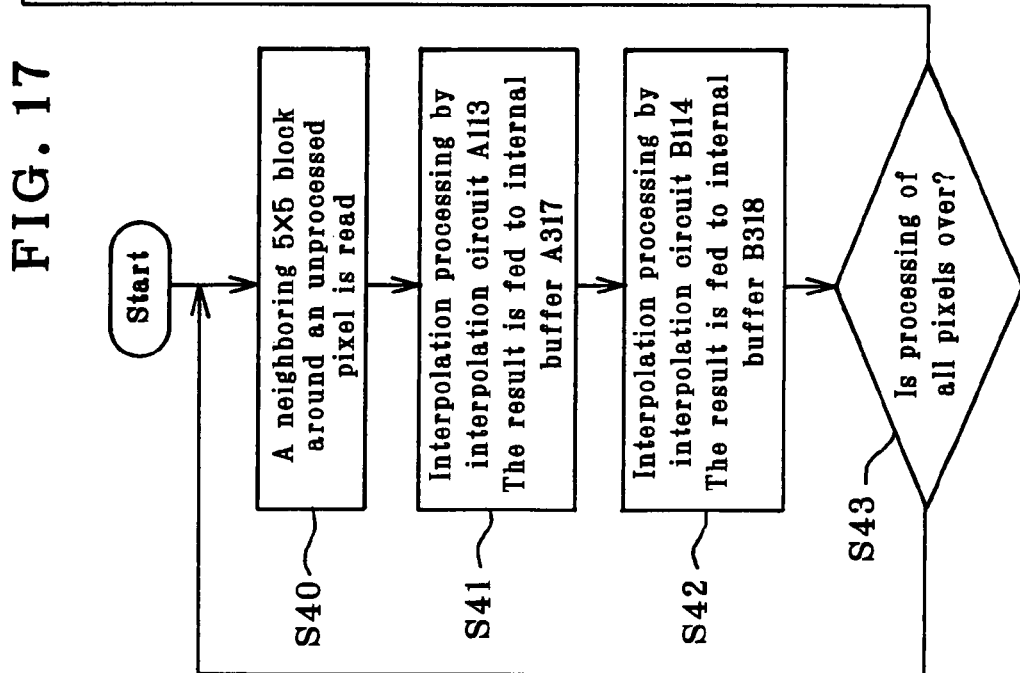
FIG. 17

| R=100 | Gr=100 | R=100 | Gr=100 |
|---|---|---|---|
| Gb=140 | B=100 | Gb=140 | B=100 |
| R=100 | Gr=100 | R=100 | Gr=100 |
| Gb=140 | B=100 | Gb=140 | B=100 |

There is a level difference between one-chip data G4 and Gb

FIG. 28(b)

| Gh=100 | Gr=100 | Gh=100 | Gr=100 |
|---|---|---|---|
| Gb=140 | Gh=140 | Gb=140 | Gh=140 |
| Gh=100 | Gr=100 | Gh=100 | Gr=100 |
| Gb=140 | Gh=140 | Gb=140 | Gh=140 |

FIG. 28(c)

| Gv=140 | Gr=100 | Gv=140 | Gr=100 |
|---|---|---|---|
| Gb=140 | Gv=100 | Gb=140 | Gv=100 |
| Gv=140 | Gr=100 | Gv=140 | Gr=100 |
| Gb=140 | Gv=100 | Gb=140 | Gv=100 |

FIG. 28(d)

| R-Gh=0 |  | R-Gh=0 |  |
|---|---|---|---|
|  | B-Gh=-40 |  | B-Gh=-40 |
| R-Gh=0 |  | R-Gh=0 |  |
|  | B-Gh=-40 |  | B-Gh=-40 |

Horizontal color difference before interpolation

R-Gh=0
B-Gh=-40
(Constant irrespective of place)

FIG. 28(e)

| R-Gv=-40 |  | R-Gv=-40 |  |
|---|---|---|---|
|  | B-GV=0 |  | B-GV=0 |
| R-Gv=-40 |  | R-Gv=-40 |  |
|  | B-GV=0 |  | B-GV=0 |

Vertical color difference before interpolation

R-Gv=-40
B-Gv=0
(Constant irrespective of place)

IMAGE PROCESSING DEVICE AND IMAGE PROCESSING PROGRAM FOR ACQUIRING SPECIFIC COLOR COMPONENT BASED ON SENSITIVITY DIFFERENCE BETWEEN PIXELS OF AN IMAGING DEVICE

This application is a U.S. National Phase Application under 35 USC 371 of International Application PCT/JP2005/008827 filed May 10, 2005.

TECHNICAL ART

The present invention relates to an image processor and an image processing program, which are each adapted to process an image output of a one-chip imaging system, a two-chip imaging system or a three-chip offset-site pickup imaging system to generate a color digital image having a three color component value for each pixel.

BACKGROUND ART

A one-chip imaging system used for digital cameras, etc. incorporates a one-chip imaging device having different color filters for each pixel, and in an image output from the device, there is only one color component value obtained for each pixel. To generate a color digital image, therefore, it is necessary to implement interpolation processing for making up for a missing color component value for each pixel. This interpolation processing is also needed at a time when a two-chip imaging system or three-chip offset-site pickup imaging system is used. Unless some modifications are applied to the interpolation processing, eventually the image will undergo blurring or deterioration such as color noise. For this reason, there have been various methods proposed so far in the art.

FIG. 1 is illustrative of one edge detection-based prior art set forth in JP-A 8-298669, which is directed to a one-chip Bayer array imaging device having a color filter arrangement shown in FIG. 1(a). For this imaging device, first, there are a cruciform of neighbors around B5 that is a pixel of interest, as shown in FIG. 1(b). Then, interpolation values Gh, Gv of G in the horizontal and vertical directions with respect to the pixel of interest are estimated for equation (1)

$$Gh=(G4+G6)/2+(2*B5-B3-B7)/4$$

$$Gv=(G2+G8)/2+(2*B5-B1-B9)/4 \qquad (1)$$

Then, estimation values dH, dV indicative of in which of horizontal or vertical directions there are more levels are calculated from equation (2)

$$dH=|G4-G6|+|B3-2*B5+B7|$$

$$dV=|G2-G8|+|B1-2*B5+B9| \qquad (2)$$

Finally, the interpolation value in the direction that has a smaller estimation value and, hence, is judged to be a lot more flat is used. Note here that |x| is indicative of the absolute value of x.

When such image processing as described above is applied to a practical imaging system, there is a sensitivity variable between pixels where the same color component is to be obtained, because of a gain difference between lines and because even with pixels having the same color filter, there are tiny spectral differences from filter to filter. Still, patent publication 1, referred to as the prior art, shows that the color component obtained at the pixel of interest is used as the result of interpolation processing as such or without being corrected. Further, when a missing color component at the pixel of interest is found, too, the information of the pixel of interest itself remains reflected on the result of interpolation processing. This causes sensitivity variations between pixels to be carried over as such to the result of interpolation, offering an ailment problem that lattice patterns are faintly visible.

In view of such problems with the prior art as mentioned above, it is an object of the present invention to provide an image processor and an image processing program, which have high precision yet enable interpolation processing with no or little ailment to be implemented even when there is a sensitivity variable in a sensor.

DISCLOSURE OF THE INVENTION (1) In order to accomplish the above object, the first embodiment of the present invention provides an image processor adapted to process data taken through an imaging device in which there is a sensitivity difference between pixels with which a specific color component is acquired, characterized by comprising:

multiple interpolation means for making up for a missing color component for each pixel of said data, mixing means for mixing outputs from said multiple interpolation means, and control means for controlling at least one of said interpolation means and said mixing means depending on said sensitivity difference. With this arrangement wherein the results of multiple interpolations are mixed in an optimum fashion depending on a sensitivity difference, interpolation can be implemented with no failure, even when there is a sensitivity difference.

(2) According to the second embodiment, the present invention provides an image processor adapted to process data obtained through an imaging device in which there is a sensitivity difference between pixels with which a specific color component is acquired, characterized by comprising:

multiple interpolation means for making up for a missing color component for each pixel of said data, and mixing means for mixing outputs from said multiple interpolation means, wherein said interpolation means and said mixing means are set depending on said sensitivity difference. With this arrangement wherein the interpolation means and the mixing means are set in such a way as to be adaptive to where there is a sensitivity difference in input data, there are the results of interpolation obtained with no failure.

(3) The image processor according to the first embodiment is further characterized in that at least one of said multiple interpolation means is a linear filter, and said control means is adapted to set a coefficient of each filter depending on said sensitivity difference. With this arrangement wherein the filter coefficient is controlled depending on the sensitivity difference so that the influence of the sensitivity difference is not carried over to the results of interpolation, the results of interpolation with no failure can be obtained even with input data having a sensitivity difference.

(4) The image processor according to the second embodiment is further characterized in that at least one of said multiple interpolation means is a linear filter, and a coefficient thereof is set depending on said sensitivity difference. With this arrangement wherein the filter coefficient is set such that the influence of the sensitivity difference is not carried over to the results of interpolation, the results of interpolation with no failure can be obtained even with input data having a sensitivity difference.

(5) The image processor according to the first or the second embodiment is further characterized in that said coefficient is set such that the degree of amplification of a frequency component caused by said sensitivity difference in said data is kept within a given range. With this arrangement wherein any frequency component given by the sensitivity difference to the results of interpolation is eliminated, it is unlikely for the sensitivity difference to have influences on the results of interpolation.

(6) The image processor according to the first embodiment is further characterized in that said control means comprises sensitivity difference estimation means for estimating the sensitivity difference of said imaging device. With this arrangement wherein to what degree there is practically a sensitivity difference is estimated, proper processing can be implemented depending on the result of estimation with the result that there are much more reduced influences of the sensitivity difference on the results of interpolation.

(7) The image processor according to the first embodiment is further characterized in that said sensitivity difference estimation means makes a sensitivity difference estimation based on the type of said imaging device or a condition under which said data are taken. This arrangement makes it possible to use an ordinary sensitivity difference estimation method (as by way of comparison of the values of pixels having the same color component in an image) so that the image processor can be best adaptive to the quantity and pattern of a sensitive difference generated inherently in a specific sensor or a specific taking condition.

(8) The image processor according to the first embodiment is further characterized in that said mixing means comprises selection means for selecting either one of the results of said multiple interpolations, and said control means makes a decision of which one of said results is to be selected by said selection means based on said sensitivity difference. With this arrangement wherein the optimum result of interpolation is selectable depending on the sensitivity difference, there is interpolation processing implemented with no failure, even when there is a sensitivity difference.

(9) The image processor according to the first embodiment is further characterized in that said mixing means comprises weighted average means for applying a weighted average to the results of said multiple interpolations, and said control means makes a decision of a weight of said weighted average means depending on said sensitivity difference. With this arrangement wherein a weighted average is applicable to the results of multiple interpolations, there is interpolation processing implemented with no failure, even when there is a sensitivity difference.

(10) The image processor according to the first or the second embodiment is further characterized in that said mixing means separates each of the results of said multiple interpolations into multiple frequency components, so that after a weighed average with a different weight for each frequency component, said multiple frequency components are again combined. With this arrangement, after each of the results of interpolations is separated into multiple frequency components, they are again combined with a weight different for each component, so that the selective adjustment of only a frequency component affected by the sensitivity difference is facilitated. As a result, interpolation processing can be implemented while any failure ascribable to the sensitivity difference is prevented and without causing insignificant blurring in the results of interpolation.

(11) The image processor according to the first embodiment is further characterized in that said control means comprises sensitivity difference measurement means for measuring the quantity of a sensitivity difference remaining in the result selected from the results of said multiple interpolations, whereby said mixing means is controlled based on the result of measurement. With this arrangement, while the influence of the sensitivity difference contained in the results of interpolation is directly measured, the mixing means is controlled such that the influence of the sensitivity difference is reduced, making surer prevention of a failure in the results of interpolation caused by the sensitivity difference than would be possible with indirect sensitivity difference measurement.

(12) The image processor according to the first embodiment is further characterized in that said control means comprises direction discrimination means for judging an edge direction near each pixel of said data, so that said mixing means is controlled based on the result of direction discrimination. This arrangement allows for mixing of the results of multiple interpolations depending on the edge direction, ensuring high-precision interpolation.

(13) According to the first embodiment, the present invention also provides an image processing program for letting a computer implement steps, wherein said steps comprise a step of reading in said computer data taken through an imaging device in which there is a sensitivity difference between pixels with which a specific color component is acquired, multiple interpolation processing steps of making up for a missing color component for each pixel of said data, a step of mixing outputs based on said multiple interpolation processing steps, and a step of controlling at least one of said interpolation processing steps and said mixing step based on said sensitivity difference.

(14) According to the second embodiment, the present invention also provides a color component interpolation image processing program for letting a computer implement steps, characterized in that said steps comprises a step of reading in said computer data taken through an imaging device in which there is a sensitivity difference between pixels with which a specific color component is acquired, multiple interpolation processing steps of making up for a missing color component for each pixel of said data, and a step of mixing outputs based on said multiple interpolation processing steps, and said multiple interpolation processing steps and said mixing step are set depending on said sensitivity difference.

(15) In the first embodiment of the present invention, the color component interpolation image processing program according to (13) above is further characterized in that at least one of said multiple interpolation processing steps is interpolation processing with a linear filter, and said control step further comprises a step of setting a coefficient of said filter such that the degree of amplification of a frequency component caused by said sensitivity difference in said data is kept within a given range.

(16) In the second embodiment of the present invention, the color component interpolation image processing program according to (14) above is further characterized in that at least one of said multiple interpolation processing steps is interpolation processing with a linear filter, and a coefficient of said filter is set such that the degree of amplification of a frequency component caused by said sensitivity difference in said data is kept within a given range.

(17) The color component interpolation image processing program according to (13) above is further characterized in that said control step further comprises a step of making an estimation of the sensitivity difference of said imaging device based on the type of said imaging device or a condition under which said data are taken.

(18). The color component interpolation image processing program according to (13) above is further characterized in that said mixing step further comprises a step of applying weighted average processing to the results of said multiple interpolation processing steps, and said control step further comprises a step of making a decision of a weight of said weighted average processing depending on said sensitivity difference.

(19) The color component interpolation image processing program according to (13) above is further characterized in that said control means further comprises a step of judging an edge direction near each pixel of said data, and said mixing step is controlled based on the result of processing at said edge direction judgment step.

With the image processing program for color component interpolation according to the first, and the second embodiment of the present invention, it is possible to implement, on software, color component interpolation processing of image data in which there is a sensitivity difference between pixels with which a specific color component is acquired.

Thus, the present invention can provide an image processor and an image processing program, which have high precision and enable interpolation processing to be implemented with no or little ailment, even when there is a sensitivity variation in a sensor.

BRIEF EXPLANATION OF THE DRAWINGS

FIG. 4 is illustrative of how to implement interpolation by the interpolation circuit A113.

FIG. 5 is a flowchart of processing at the G interpolation circuit 106.

FIG. 8 is illustrative of a neighboring pattern processed by the RB interpolation circuit 109.

FIG. 9 is illustrative of processing at the RB interpolation circuit 109.

FIG. 10 is a flowchart for the first embodiment.

FIG. 14 is representative of the characteristics of a linear filter.

FIG. 17 is a flowchart for the second embodiment.

FIG. 23 is representative of data used with the RB interpolation circuit 409.

FIG. 28 is illustrative of examples of color difference signals.

BEST MODE FOR CARRYING OUT THE INVENTION

Figures 1A, 1B:
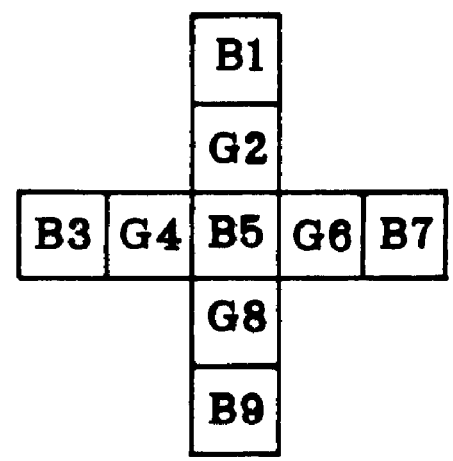
FIG. 1 is illustrative of the prior art.
Figure 2:
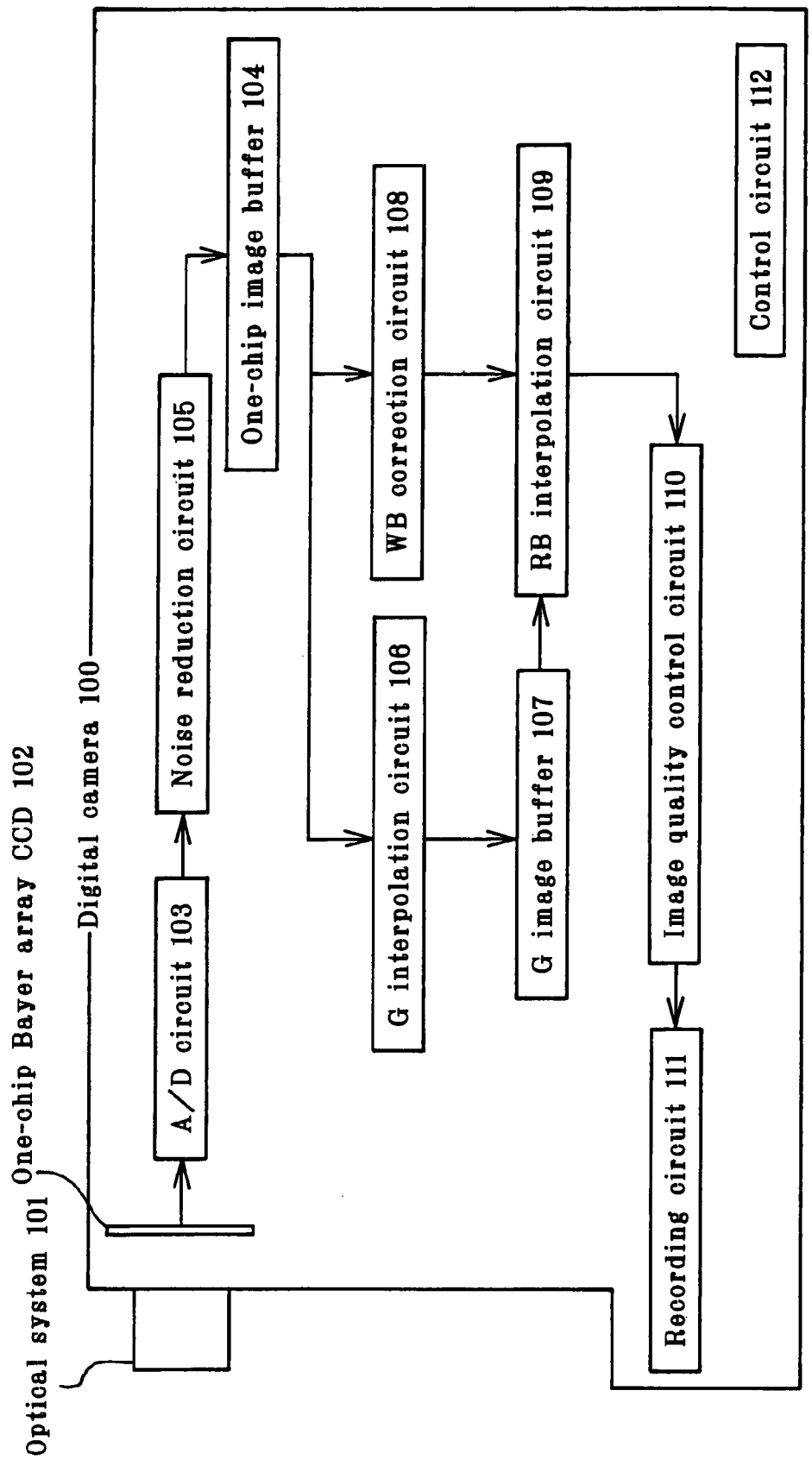
FIG. 2 is illustrative of the architecture of the first embodiment.
Figure 3:
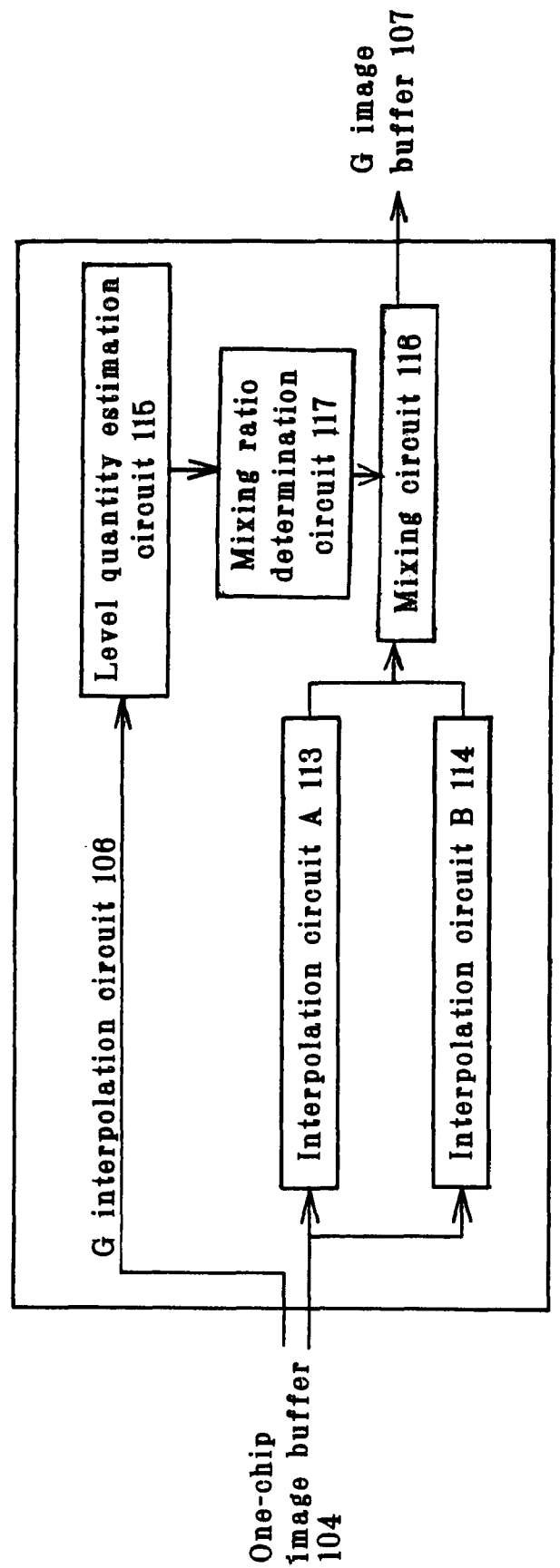
FIG. 3 is illustrative of the architecture of the G interpolation circuit 106.
Figures 6, 7:
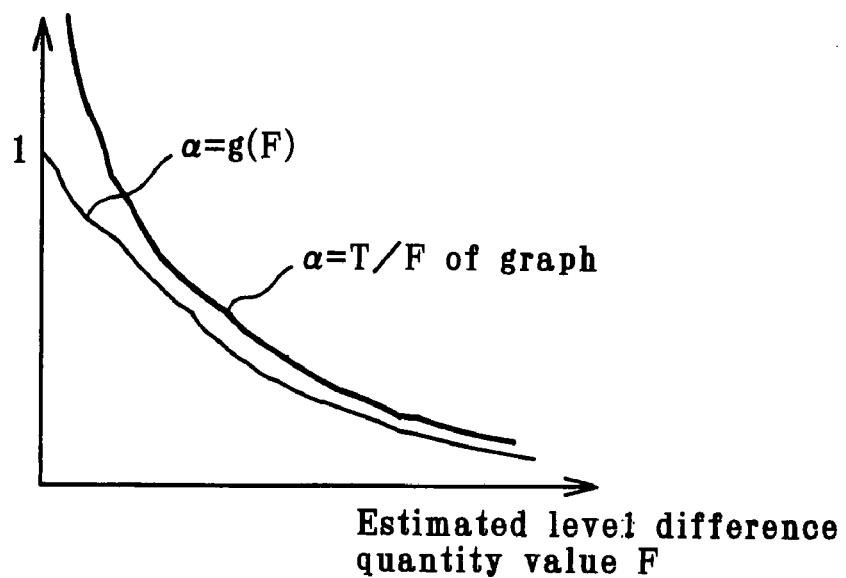
FIG. 6 is illustrative of a G level difference.
FIG. 7 is representative of the characteristics of the function g.

Embodiments of the present invention are now explained with reference to the drawings. FIGS. 2-10 show the first embodiment of the present invention: FIG. 2 is illustrative of the architecture of the first embodiment, FIG. 3 is illustrative of the architecture of the G interpolation circuit 106, FIG. 4 is representative of how to implement interpolation by the interpolation circuit A113, FIG. 5 is a flowchart representative of steps of processing by the G interpolation circuit 106, FIG. 6 is illustrative of a G level difference, FIG. 7 is representative of the characteristics of the function g, FIG. 8 is illustrative of a neighboring pattern processed by the RB interpolation circuit 109, FIG. 9 is illustrative of processing at the RB interpolation circuit 109, and FIG. 10 is a flowchart of RAW development software for the first embodiment.

Referring to FIG. 2, a digital camera 100 comprises an optical system 101, a one-chip Bayer array CCD 102, and an A/D circuit 103 for subjecting the outputs of the one-chip Bayer array CCD 102 to gain control and A/D conversion to produce them as a digital image. That digital camera also comprises a noise reduction circuit 105 for processing the output of the A/D circuit 103 to reduce noise ascribable to the one-chip Bayer array CCD 102 and record the result in a one-chip image buffer 104. Although not shown, it is acceptable to store the output of the A/D circuit 103 in an image buffer (the first buffer) and feed image signals from the first buffer to the noise reduction circuit 105, in which case the one-chip image buffer 104 functions as the second buffer. Further, the digital camera 100 comprises a G interpolation circuit 106 for processing an image in the one-chip image buffer 104 to make up for a G component at a pixel position with G component missing by interpolation from neighboring pixels and enter it into a G image buffer 107 (the third buffer). The optical system 101 and the one-chip Bayer array CCD 102 define the "imaging device" in the image processor recited in claim 1.

Further, the digital camera 100 comprises a WB correction circuit 108 for processing an image in the one-chip image buffer 104 for gain control of the value of a pixel in which there is an R or B component obtained, and RB interpolation circuit 109 for producing a color image as output, in which a color component missing throughout all pixels is compensated for from a G component of all pixels obtained from the G image buffer 107 and R and B components subjected to WB correction by the WB correction circuit 109. Furthermore, that digital camera comprises an image quality control circuit 110 for applying gray level transformation, edge enhancement, compression, etc. to the output of the RB interpolation circuit 109, a recording circuit 111 for recording the output of the image quality control circuit 110 in a recording medium and a control circuit 112 for controlling the operations of the optical system 101, the one-chip Bayer array CCD 102 and the aforesaid circuit group.

The architecture of the G interpolation circuit 106 is shown in FIG. 3. As shown in FIG. 3, the G interpolation circuit 106 comprises interpolation circuits A113 and B114 for applying two different interpolations to an image in the one-chip image buffer 104 at a pixel with the G component missing, and a mixing circuit 116 for mixing the outputs of the interpolation circuits A113 and B114 to generate the G component for all pixels. The interpolation circuits A113 and B114 in the G interpolation circuit 106 are equivalent to the "multiple interpolation means for making up for a missing color component", and the mixing circuit 116 is equivalent to the "mixing means for mixing outputs of multiple interpolation means".

Further, the G interpolation circuit 106 comprises a level difference quantity estimation circuit 115 for reading neighboring pixels around the pixel to be processed by the mixing circuit 116 out of the one-chip image buffer 104 to estimate a sensitivity difference of the G component occurring at neighboring pixels, and a mixing ratio determination circuit 117 for determining the mixing ratio at the mixing circuit 116 of outputs from two types of interpolation circuits on the basis of the level difference quantity produced out of the level difference quantity estimation circuit 115. The level difference quantity estimation circuit 115 and the mixing ratio determination circuit 117 are equivalent to the "control means for controlling the interpolation means and the mixing means depending on said sensitivity difference". In what follows, the operation of the digital camera 100 will be explained.

As a shutter not shown in FIG. 2 is pressed down, an optical image formed through the optical system 101 is first picked up by the one-chip Bayer array CCD 102, and produced as analog signal outputs. After gain control, those analog signals are A/D converted at the A/D conversion circuit 103 into a digital image in a one-chip state where there is only one color component per pixel. The noise reduction circuit 105 applies, to that image, processing for reducing noise resulting from the characteristics of the one-chip Bayer array CCD 102, sending the resulting output to the one-chip image buffer 104. Then, the G interpolation circuit 106 reads 5×5 neighboring pixels around the center pixel (the pixel of interest) to apply processing represented by the flowchart of FIG. 5 to each pixel of an image in the one-chip image buffer 104. And then, the G component in a pixel with the G component missing is interpolated to send the impeccable G component throughout the pixels into the G image buffer 107.

Each step of the flowchart of FIG. 5 is now explained. In the following explanation, data of a 5×5 neighboring block around the center pixel read are designated by X.

Step 1: A G component V1 of X relative to the center pixel is figured out. When there has already been the G component obtained at the center pixel, its value is taken as V1 at the interpolation circuit A113. When there is no G component obtained, a known interpolation method on the basis of direction discrimination is used, as described below. In what follows, such data as depicted in FIG. 4 are assumed to be obtained near the center pixel. It is noted that the G component is already obtained at pixel Gr, Gb; however, pixels found in the same row as the R pixel are designated by Gr and pixels found in the same row as the B pixel are designated by Gb to make differences. First, an average Gr'=(Gr0+Gr1)/2 of G pixels (Gr0 and Gr1) on the left and right of the center pixel (R in FIG. 4) is worked out. Then, an average Gb'=(Gb0+Gb1)/2 of G pixels just below and above the center pixel (R in FIG. 4) is worked out. Subsequently, a difference Dh=|Gr0−Gr1|, and Dv=|Gb0−Gb1| between the G pixels in the horizontal direction is worked out. If Dh<Dv, Gr' is taken as V1, and if not so, Gb' is taken as V1.

Step 2: The interpolation circuit B114 works out a G component V2 of X relative to the center pixel. The interpolation circuit B114 has a 5×5 linear filter coefficient C_i,j(i, j is an integer from 1 to 5) stored in an internal ROM, implementing calculation represented by the following equation (3)

$$V2=(\Sigma C\_k,l*X(k,l))/\Sigma C\_k,l \quad (3)$$

In equation (3), X(k,l) stands for a pixel value at coordinates (k,l) for the neighboring data X, and sums are taken of all integer sets (k,l) indicative of coordinates for pixels with the G component obtained. Note here that the filter coefficient C_i,j is set such that its frequency characteristics become zero at the horizontal, vertical Nyquist frequency. As recited in claim 5 of this application, therefore, the "filter coefficient C_i,j" is set such that the degree of amplification of a frequency component occurring in said data by reason of a sensitivity difference (between pixels with which a specific color component is acquired) is kept within a given range", and a frequency component caused by the sensitivity difference is corresponding to the Nyquist frequency.

Step 3: The level difference quantity estimation circuit 115 makes an estimation of to what degree there is a sensitivity difference occurring between the G components at X. The one-chip Bayer array CCD 102 has such a color filter array as depicted in FIG. 6; thanks to the characteristics of the sensor, however, there is a sensitivity difference occurring between Gr pixels and Gb pixels under certain taking conditions, irrespective of the sensor being designed to acquire an identical G component, ending up with a difference between the pixel values of Gr and Gb even at a time when a flat subject is taken. This difference will hereinafter be called the G level difference.

To what degree there is the G level difference here is dependent on the magnitude of the R and B components present in the neighboring block. Therefore, the level difference quantity estimation circuit 115 has a table LUT in an internal ROM, in which relations of the upper limit value of the level difference quantity between Gr pixels and Gb pixels occurring upon taking images of various subjects under various illumination conditions to neighboring R and B pixel values are previously placed in order. And then, an average R' of the R pixels and an average B' of the B pixels contained in X are worked out, and by using them as an index for reference to the table LUT contained in the internal ROM, the upper limit value of the level difference quantity, F=LUT(R',B'), is found and then forwarded to a mixing ratio determination circuit 117.

It is here noted that conditions under which the G level difference occurs and the quantity of the resultant G level difference are dependent on the maker of the one-chip Bayer array CCD 102 and taking conditions.

Therefore, the embodiment here has the aforesaid table at the ready for each model number of the one-chip Bayer array CCD 102 and for each shutter speed. And then, while the level difference quantity estimation circuit 115 is in operation, the control block 112 acquires the model number of the one-chip Bayer array CCD 102 and the shutter speed at a taking time, forwarding them to the level difference quantity estimation circuit 115. At the level difference quantity estimation circuit 115, the table in association with the model number of the designated one-chip Bayer array CCD 102 and the shutter speed is used to find the level difference quantity. The level difference quantity estimation circuit 115 here is equivalent to the "sensitivity difference estimation means for estimating the sensitivity difference of the imaging device", and the sensitivity difference estimation means is to "estimate the sensitivity difference on the basis of the type of the imaging device or the taking condition for said data" from the model number of the one-chip Bayer array CCD 102 and the shutter speed at the taking time.

Step 4: The mixing ratio determination circuit 117 is to work out a use ratio α indicative of to what degree V1 of the results of interpolation V1 and V2 obtained at the processing steps Step 1 and Step 2 is used at the mixing circuit 116 in response to the level difference quantity estimation value F entered in it from the level difference quantity estimation circuit 115. When there is a level difference between Gr and Gb, that level difference is carried over to the result V1 as such even though processed by the interpolation circuit A113, producing a horizontal or vertical streak of one pixel spacing, albeit being a flat portion. With the processing method of the interpolation circuit B114, on the other hand, the influence of the level difference is not carried over to the result V2, but instead there are more blurs occurring at an edge portion or the like than with the interpolation circuit A113. At the mixing ratio determination circuit 117, therefore, the function g determined as shown in FIG. 7 is used to figure out the use ratio α of V1 such that even when the level difference remains carried over to the result of interpolation, the visually unnoticeable upper limit level difference quantity T is not exceeded, and it is forwarded to the mixing circuit 116.

Step 5: Then, the mixing circuit 116 receives the results of interpolation V1 and V2 obtained from the two types of interpolation circuits and the use ratio α of V1 to calculate the final result of mixing V3 from equation (4)

$$V3=\alpha*V1+(1-\alpha)*V2 \quad (4)$$

Thus, the mixing circuit 116 is equivalent to the "weighted average means for finding a weighed average of results of multiple interpolations", and the control means (mixing ratio determination circuit 117 and level difference quantity estimation means 115) is equivalent to the "determination of a weight of said weighed average means depending on a sensitivity difference".

Finally, at the mixing circuit 116, V3 is written as the value of the G pixel in the center pixel of the 5×5 neighboring block in an associated pixel position in the G image buffer 107. Here, the processing steps for all pixels of an image in the one-chip image buffer 104 are over; the impeccable G component for all pixels is obtained in the G image buffer 107. Then, the WB correction circuit 108 reads pixels from the one-chip image buffer 104 on one-by-one basis, and when the obtained color component is R or B, the pixel values are multiplied by the gain necessary for white balance before being forwarded to the RB interpolation circuit 109. When the obtained color component is G, the pixel values are directly forwarded to the RB interpolation circuit 109.

At the RB interpolation circuit 109, the gain controlled pixel values produced out of the WB correction circuit 108 are sequentially stored in the buffer in it. After the completion of the processing by the WB correction circuit 108 of all pixels in the one-chip image buffer 104, RGB three color components for all pixels in the buffer are calculated by a known method. First, the RB interpolation circuit 109 reads a 5×5 neighboring block around each pixel in the internal buffer. As shown in FIGS. 8(a) and 8(b), there are various neighboring patterns depending on the color component obtained at the pixel of interest; however, they may be processed in the same way.

Then, at the RB interpolation circuit 109, a 5×5 neighboring block corresponding to the 5×5 neighboring block read out of the internal buffer is read out of the G image buffer 107, too. And then, the final RGB components are worked out in the following steps with X indicative of neighboring data read out of the internal buffer and Y indicative of neighboring data read out of the G image buffer 107. First, data XR with the value of a pixel, with which no R component is obtained, set at 0 are generated from X. Likewise, data XB with the value of a pixel, with which no B component is obtained, set at 0 are generated from X.

Then, there are data YR generated from Y, with the value of a pixel at the same coordinates as the pixel having no R component obtained in X set at 0. Likewise, there are data YB generated from Y, with the value of a pixel at the same coordinates as the pixel having no B component obtained in X set at 0. FIG. 9 is typically representative of X, Y, XR, XB, YR and YB. After such data sets are placed in order, the following processing steps (a) to (d) are implemented.

(a) A 5×5 low-pass filter of the same coefficient is applied to XR, XB, YR, and YB to obtain results RL, BL, GL1 and GL2. (b) A 5×5 band-pass filter is applied to Y to obtain a result GH. (c) The value of the center pixel in Y is taken as the final G component G'. (d) The final R component R' and B component B' are worked out of the following equation (5)

$$R'=RL+GH-GL1$$

$$B'=BL+GH-GL2 \quad (5)$$

The thus obtained (R', G', B') is entered in the image quality control circuit 110.

Here, the processing by the RB interpolation circuit 109 of all pixels in the internal buffer is over; a color image is entered in the image quality control circuit 110, in which color image each pixel in the one-chip image buffer 104 is made up for a missing color component. Thereafter, at the image quality control circuit 110, processing such as color conversion, edge enhancement and gray level transformation is applied to the entered color image that is then entered in the recording circuit 111, at which the entered image is recorded in a recording medium not shown. The completion of recording processing means that all image pickup operations of the digital camera 100 are over.

It is noted that the embodiment here operates on circuitry, but similar processing may also be implemented on software. FIG. 10 is a flowchart of processing steps run on software. This software is to apply development processing to a RAW data file with the output of a one-chip Bayer array CCD stored in it upon A/D conversion. In what follows, each step of the flowchart will be explained.

Step 7: One-chip data are read out of the RAW data file, and stored as a two-dimensional array in a buffer 1. Step 8: Noise reduction processing equivalent to the noise reduction circuit 105 is applied to an image in the buffer 1, and the output is forwarded to a buffer 2. Step 9: The buffer is scanned first in a row direction and then in a column direction to select pixels that remain unprocessed at Steps 10-12. Here, if there is no unprocessed pixel, Step 13 takes over, and if there is an unprocessed pixel, Step 10 takes over. Step 10: A neighboring 5×5 block around the unprocessed pixel is read out of the buffer 2. Step 11: According to the flowchart of FIG. 5, G component interpolation processing is applied to the unprocessed pixel. Step 12: The result of interpolation is written in an unprocessed pixel associated address in a buffer 3 provided separately from the buffers 1 and 2. And then, Step 9 is resumed.

Step 13: WB processing equivalent to the WB correction circuit 108 is applied to an image in the buffer 2 to enter the output in the buffer 2. Step 14: The buffer 2 is scanned first in a row direction and then in a column direction to select an unprocessed pixel at Steps 15 to 17. In this case, if there is no un-processed pixel, Step 18 takes over, and if there is unprocessed pixel, Step 15 takes over. Step 15: A neighboring 5×5 block around the pixel position of the unprocessed pixel is read out of the buffers 2 and 3.

Step 16: Processing equivalent to the RB interpolation circuit 109 is implemented to work out an RGB component for the unprocessed pixel. Step 17: That RGB component is written in an address in association with an unprocessed pixel in the buffer 1, and Step 14 is resumed. Step 18: Image quality control processing equivalent to the image quality control circuit 110 is applied to an image in the buffer 1 to enter the output in the buffer 2. Step 19: The image in the buffer 2 is forwarded to a designated file for the completion of processing.

Figure 11:
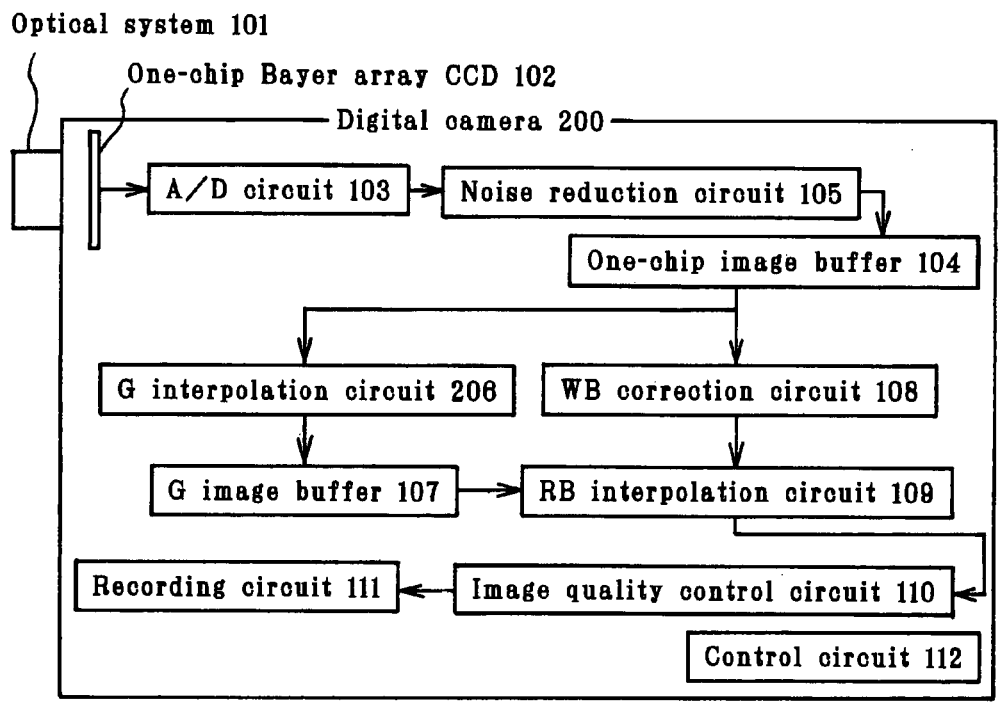
FIG. 11 is illustrative of the architecture of the second embodiment.
Figure 12:
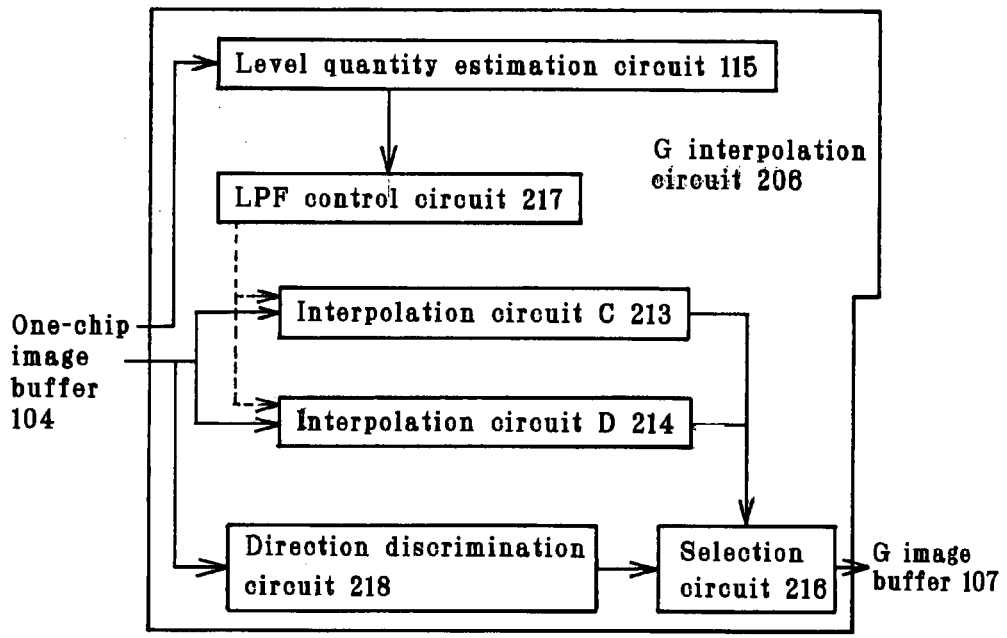
FIG. 12 is illustrative of the architecture of the G interpolation circuit 206.
Figure 13:
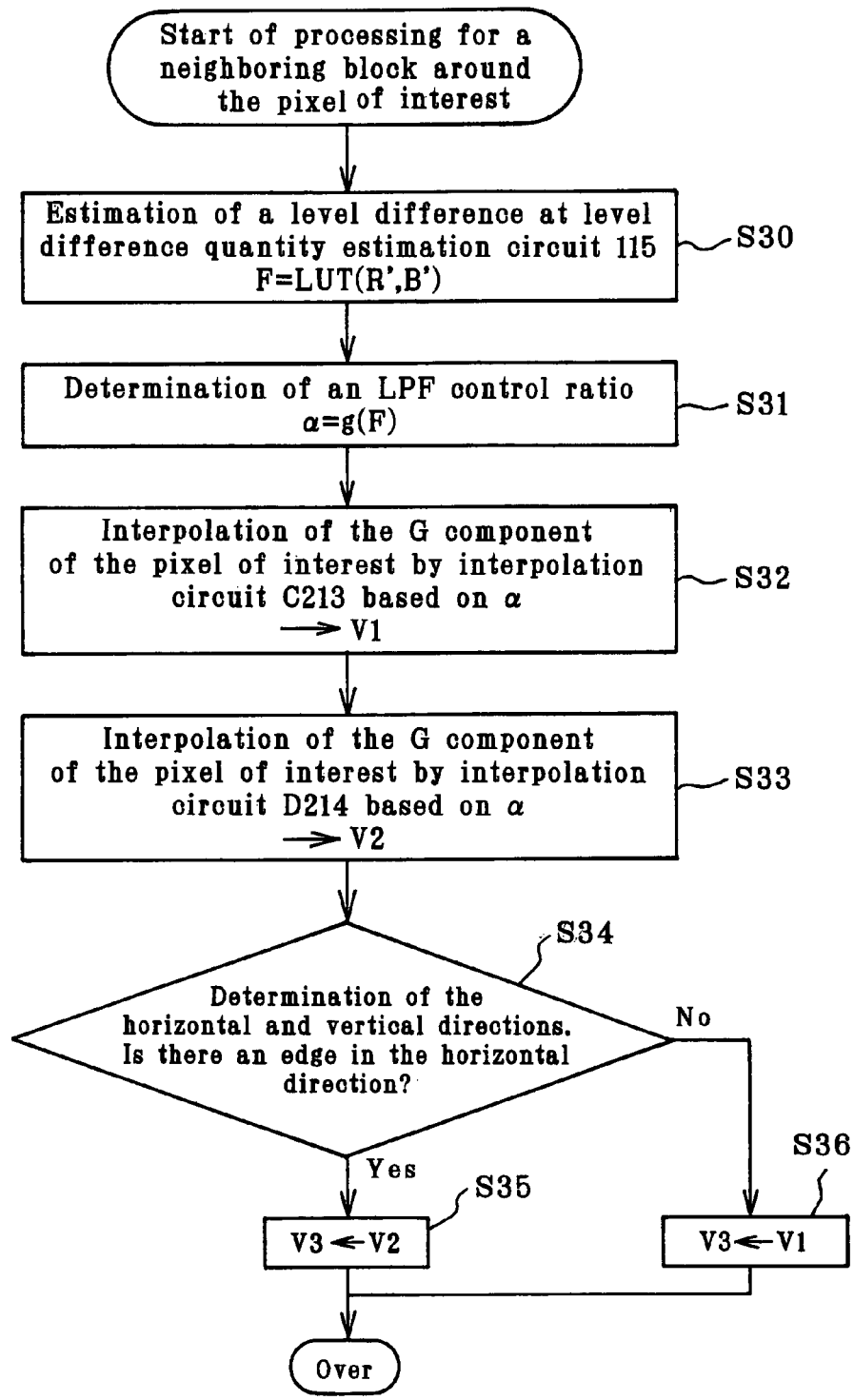
FIG. 13 is a flowchart of processing at the G interpolation circuit 206.
Figure 24:
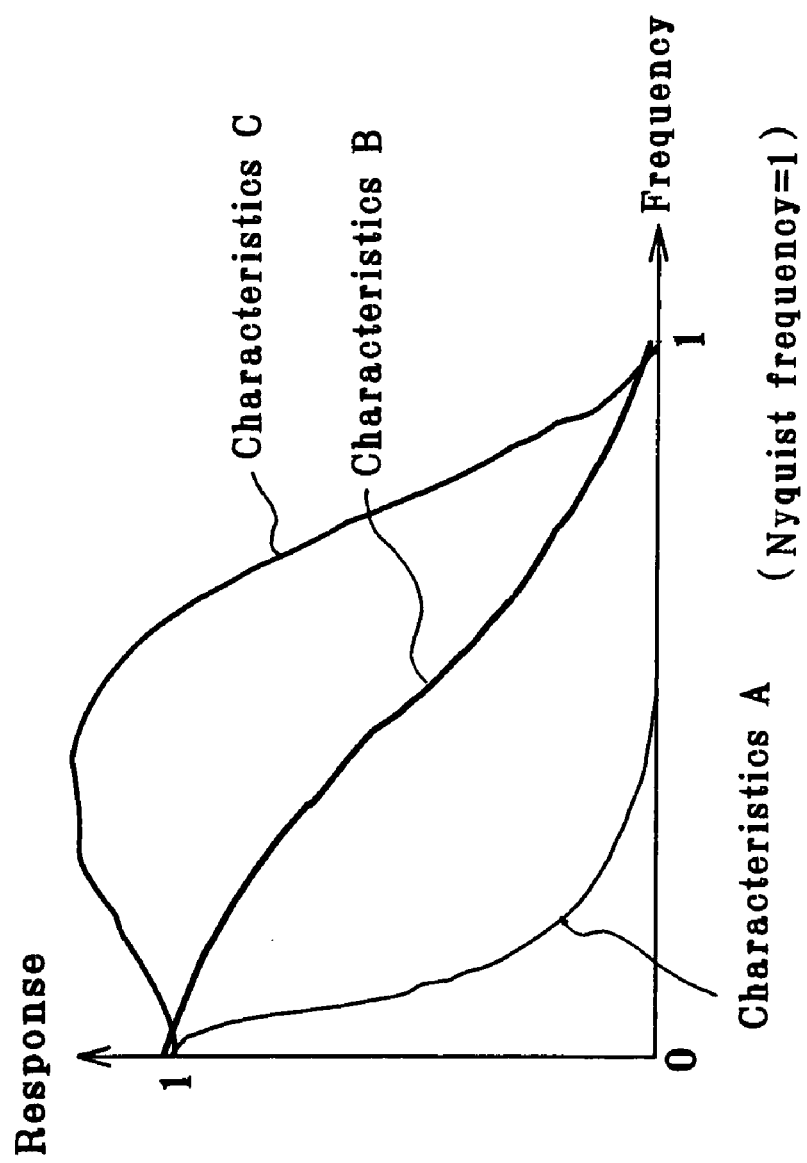
FIG. 24 is representative of the characteristics of a filter used with the LPF circuit 420.
Figure 26:
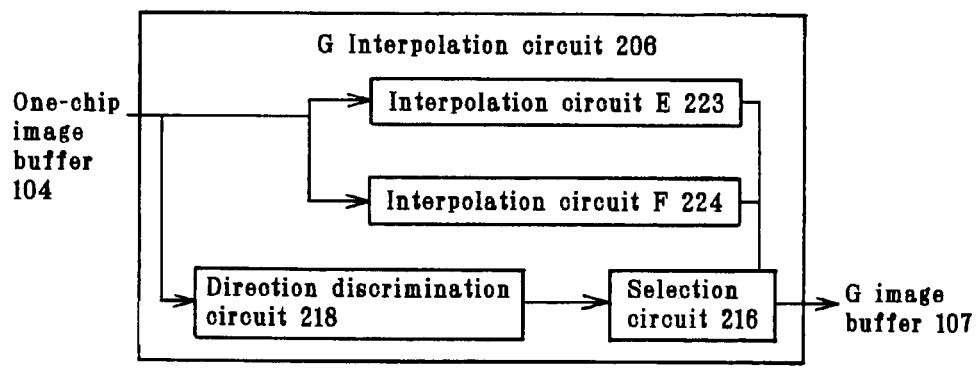
FIG. 26 is illustrative of the architecture of the G interpolation circuit 206 in a modification to the second embodiment.

FIGS. 11-14 and FIG. 26 are illustrative of the second embodiment of the present invention. FIG. 11 is illustrative of the architecture of the second embodiment; FIG. 12 is illustrative of the architecture of the G interpolation circuit 206; FIG. 13 is a flowchart of processing at the G interpolation circuit 206; FIG. 24 is representative of the characteristics of a linear filter used with the interpolation circuit C213 and the direction discrimination circuit 218; and FIG. 26 is illustrative of the architecture of the G interpolation circuit 206 in a modification to the second embodiment.

The second embodiment is directed to a digital camera as is the case with the first embodiment. In FIG. 11, a digital camera 200 of the second embodiment is the same in architecture and operation as the digital camera 100 (FIG. 2) of the first embodiment except that the G interpolation circuit 106 is changed to the G interpolation circuit 206. Like parts or components in FIG. 2 are indicated by like numeral references, and detailed reference to them will not be made.

FIG. 12 is illustrative of the architecture of the G interpolation circuit 206. The G interpolation circuit 206 comprises two kinds of interpolation circuit C213 and interpolation circuit D214, a level difference quantity estimation circuit 115, a direction discrimination circuit 218 and a selection circuit 216. The level difference quantity estimation circuit 115 receives an image signal from the one-chip image buffer 104, and enters the output in an LPF control circuit 217. The interpolation circuits C213 and D214 receive the parameters necessary for interpolation from the LPF control circuit 217 and an image signal from the one-chip image buffer 104, and enter the output in the selection circuit 216. In addition, the selection circuit 216 receives an image signal from the direction discrimination circuit 218, and enters the output in the G image buffer 107. The direction discrimination circuit 218 receives an image signal from the one-chip image buffer 104.

Then, the operation of the digital camera 200 is explained. The digital camera 200 is the same in architecture and operation as the digital camera 100 explained with reference to FIG. 2 except for the G interpolation circuit 206; only the G interpolation circuit 206 will be described. As is the case with the G interpolation circuit 106 in the first embodiment, the G interpolation circuit 206 reads a neighboring block around each pixel in a one-chip image in the one-chip image buffer 104 to work out a G component of the center pixel. However, the size of the block to be read is N×N (N is an integer of at least 5) that is larger than that in the G interpolation circuit 106.

In the second embodiment, two kinds of interpolation circuits C213 and D214 are equivalent to the "multiple interpolation means for making up for a missing color component", and the selection circuit 216 is equivalent to the "mixing means". Further, the level difference quantity estimation circuit 115, the LPF control circuit 217 and the direction discrimination circuit 218 are equivalent to the "control means", and the level difference quantity estimation circuit 115 is equivalent to the "sensitivity variable estimation means". That sensitivity variable estimation means is to estimate a sensitivity variable on the basis of the type of said image device and a taking condition for said data.

FIG. 13 is a flowchart of processing by the G interpolation circuit 206 of a neighboring block around each pixel. In what follows, each step of the flowchart will be explained, with X indicative of data of the read neighboring block.

Step 30: In the second embodiment, too, thanks to the characteristics of the one-chip Bayer array CCD 102, there is a sensitivity difference (G level difference) occurring between Gr pixels and Gb pixels under certain taking conditions, irrespective of the CCD 102 being designed to acquire identical G components. The level difference quantity estimation circuit 115 makes an estimation of a level difference quantity between Gr pixels and Gb pixels in X, as is the case with Step 3 in FIG. 5 illustrative of the first embodiment.

Step 31: There is a parameter a determined by the LPF control circuit 217 for control of processing at the interpolation circuits C213 and D214 in response to a level difference quantity F entered from the level difference quantity estimation circuit 115. To clarify α, what is processed by interpolation is first explained with reference to the interpolation circuit C213. The interpolation circuit C213 comprises two kinds of linear filter coefficients, and their frequency characteristics are set as shown in FIGS. 14(a) and 14(b), for instance, with reference to filters P_i,j and Q_i,j in the interpolation circuit C213, where i and j are each an integer of 1 to N. In any case, there are band characteristics differing in the horizontal and vertical directions, and a response at the horizontal Nyquist frequency is set to 0 at P_i,j and to 1 at Q_i,j.

At the interpolation circuit C213, a new filter coefficient C_i,j is calculated from the following equation (6) in response to a mixing ratio (control ratio) a entered from the LPF control circuit 217

$$C\_i,j = \alpha * Q\_i,j + (1-\alpha) * P\_i,j \quad (6)$$

And then, this filter is applied to X. The filter coefficient C_i.j is equivalent to the "coefficient of each filter"; the filter coefficient Q_i.j is "set depending on a sensitivity difference"; and the filter coefficient P_i.j in the interpolation circuit C213 is equivalent to the "coefficient".

Here, if α is zero, filtering takes place at P_i.j; however, the level difference occurring between Gr and Gb does not reflect on the result of filtering, because of having primarily influences on the component of the Nyquist frequency. If α is 1, on the other hand, filtering takes place at Q_i.j and the level difference reflects directly on the result of filtering. Therefore, if, at the LPF control circuit 217, the mixing ratio α is determined by way of a function g(F) for the estimated level difference quantity F, the influences of the level difference contained in the result of filtering by the interpolation circuit 213 can then remain minimized in any circumstances. FIG. 7 shows one example of the preferable characteristics of the function g.

Step 32: The interpolation circuit C213 uses equation (6) to calculate the filter coefficient C_i,j from the mixing ratio α produced out of the LPF control circuit 217 as mentioned above, and then implements calculation represented by the following equation (7)

$$V1 = (\Sigma C\_k,l * X(k,l)) / \Sigma C\_k,l \quad (7)$$

And then, V1 is entered as output in the selection circuit 216. In equation (7), X(k,l) stands for a pixel value at coordinates (k,l) for the neighboring data X, and sums are taken of all integer sets (k,l) indicative of coordinates for pixels with the G component obtained.

Step 33: As is the case with the interpolation circuit C213, the interpolation circuit D214 implements filtering by means of a filter with two kinds of filter coefficients mixed yet with a difference that instead of P_i,j and Q_i,j, P~_i,j and Q~_i,j that are obtained by a 90° rotation of them are used. In other words, instead of equation (5), equation (8) C_i,j=α*Q~_i,j+(1−α)*P~_i,j is figured out, and thereafter the same filtering processing as that by the interpolation circuit C213 is implemented. And then, the result is entered as V2 in the selection circuit 217.

Step 34: At the direction discrimination circuit 218, the direction of an edge in the read neighboring block is discriminated to make a decision over which of the output V1 of the interpolation circuit C213 and the output V2 of the interpolation circuit D214 is to be used at the selection circuit 216. For this reason, the direction discrimination circuit 218 holds a band-pass filter F1 for detecting a horizontal edge and a band-pass filter F2 for detecting a vertical edge in its internal ROM. The coefficient of F1 is set such that its frequency characteristics are shown in FIG. 14(c), and the coefficient of F2 is set such that its frequency characteristics are shown in FIG. 14(d).

At the direction discrimination circuit 218, the G component in X is multiplied by filters F1 and F2 to obtain results Dh and Dv. To limit processing to only the G component in this case, a sum is taken of only pixel positions with the G component obtained, as is the case with the interpolation circuit C213. In general, when the direction of an edge in the neighboring block is closer to horizontal than to a 45° obliquity, Dv grows larger, and when closer to vertical than to a 45° obliquity, Dh grows larger. At the direction discrimination circuit 218, therefore, the magnitude of result Dh is compared with the magnitude of result Dv so that if Dh<Dv, the edge is judged to be horizontal to enter 1 in the selection circuit 216, whereas if Dh>Dv, the edge is judged to be vertical to enter 0 in the selection circuit 216. The direction discrimination circuit 218 is equivalent to the "discrimination means for judging the direction of an edge in a neighboring block around each pixel in data".

Step 35: At the selection circuit 216, when the edge direction is 1 on the basis of the input V1 from the interpolation circuit C213, the input V2 from the interpolation circuit D214 and the edge direction input from the direction discrimination circuit 218, V2 is taken as the final result V3 of interpolation. Step 36: On the other hand, when the edge direction is 0, V1 is taken as the final result V3 of interpolation. Finally, V3 is written in a pixel position corresponding to the center pixel in X in the G image buffer 107.

The G interpolation circuit 206 may just as easily operate on software, too. To this end, changing the G interpolation processing at Step 11 in the flowchart of FIG. 10 from the flowchart of FIG. 5 to the flowchart of FIG. 13 is only needed.

To the embodiment here, there are some possible modifications. For instance, instead of selecting either one of the results of interpolation at the interpolation circuits C213 and D214, it is acceptable to implement weighted average using Dh and Dv calculated at the direction discrimination circuit 218. In this case, there is a weighed average circuit provided in lieu of the selection circuit 216, so that the final result V3 is calculated from, for instance, equation (9)

$$V3=(Dv/(Dv+Dh))*V2+(Dh/(Dv+Dh))*V1 \quad (9)$$

In the embodiment here, processing is implemented for each level difference quantity judged per pixel. However, there is one possible modification wherein, as shown in FIG. 26, to keep any failure at bay whatever level difference there may be, only interpolation processing designed to be not affected by that level difference is implemented. FIG. 26 is illustrative of the architecture of the G interpolation circuit 206 in that modification to the second embodiment. As can be seen from a comparison with the architecture of FIG. 12, the level difference quantity estimation circuit 115 and the LPF control circuit 217 are removed from the G interpolation circuit 206.

There is an interpolation circuit E223 provided in place of the interpolation circuit C213, and an interpolation circuit F224 provided in place of the interpolation circuit D214. Circuit operation is otherwise the same. Whereas the interpolation circuit C213 comprises two types of filters P_i,j and Q_i,j, the interpolation circuit E223 does not have Q_i,j; filtering takes place by way of P_i,j alone. The interpolation circuit F224, too, implements filtering by way of P.sup-..about._i,j alone, leading to the results of interpolation being always not affected by the level difference. A selection circuit 216 in the modification of FIG. 26 works to select either one of the results of interpolation at the interpolation circuits E223 and F224, equivalent to the "selection means for selecting either one of results of multiple interpolations".

The architecture of FIG. 26 is equivalent to the requirements recited in the claims. That is, the interpolation circuits E223 and F224 are equivalent to "multiple interpolation means for making up for a missing color component for each pixel in data", and the selection circuit 116 is equivalent to the "mixing means for mixing outputs from said multiple interpolation means". The interpolation means and mixing means here are "set depending on said sensitivity difference (between pixels with which a specific color component is acquired)".

In the modification of FIG. 26, too, the corresponding processing may just as easily be run on software. To this end, in the flowchart of FIG. 10, the G interpolation processing of FIG. 11 may be replaced by the flowchart of FIG. 29. In what follows, the flowchart of FIG. 29 will be explained. Step 70: The same filtering processing as in the interpolation circuit E223 is implemented to obtain a result V1. Step 71: The same filtering processing as in the interpolation circuit F224 is implemented to obtain a result V2. Step 72: The same edge direction discrimination processing is implemented as in the direction discrimination circuit 218, and if there is a horizontal edge, processing moves to Step 73, and if there is a vertical edge, processing moves to Step 74. Step 73: The result V1 at Step 70 is taken as the final result V3 of interpolation of the G component. Step 74: The result V2 at Step 71 is taken as the final result V3 of interpolation of the G component.

Figure 15:
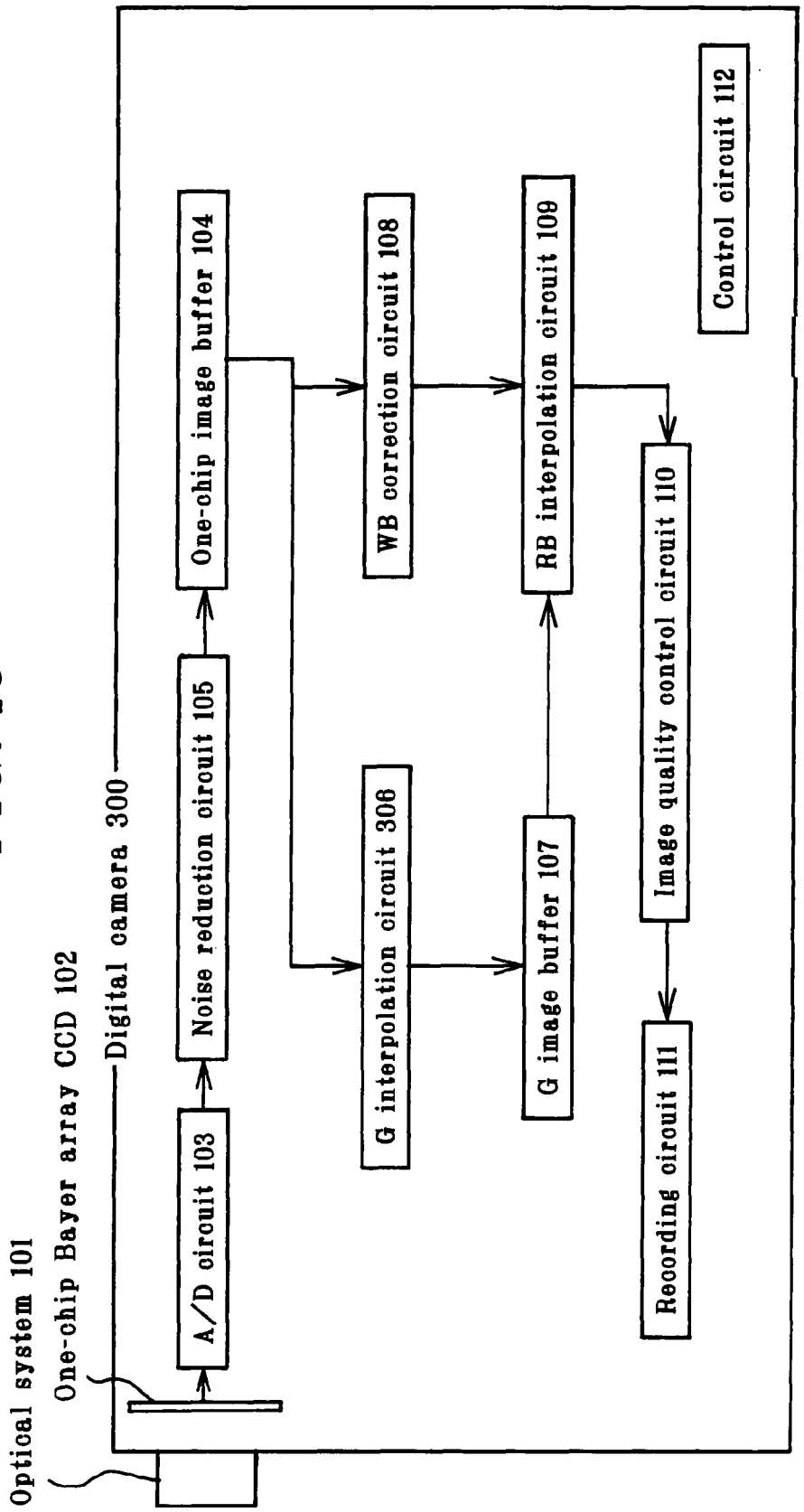
FIG. 15 is illustrative of the architecture of the third embodiment.
Figure 16:
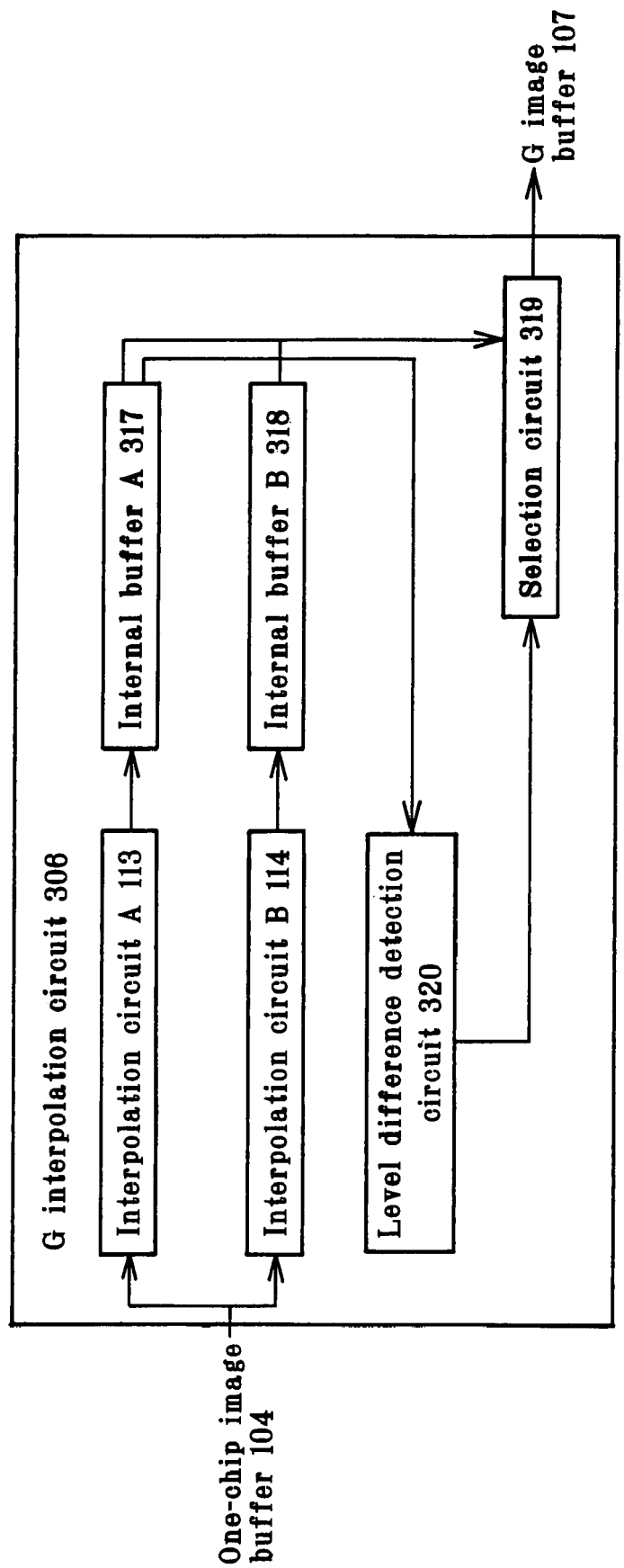
FIG. 16 is illustrative of the architecture of the G interpolation circuit 306.
Figure 18:
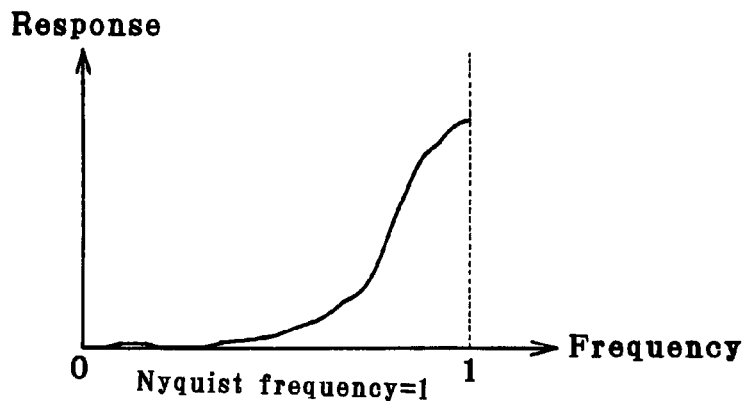
FIG. 18 is representative of the characteristics of a filter used with a level difference detection circuit 320.
Figure 27:
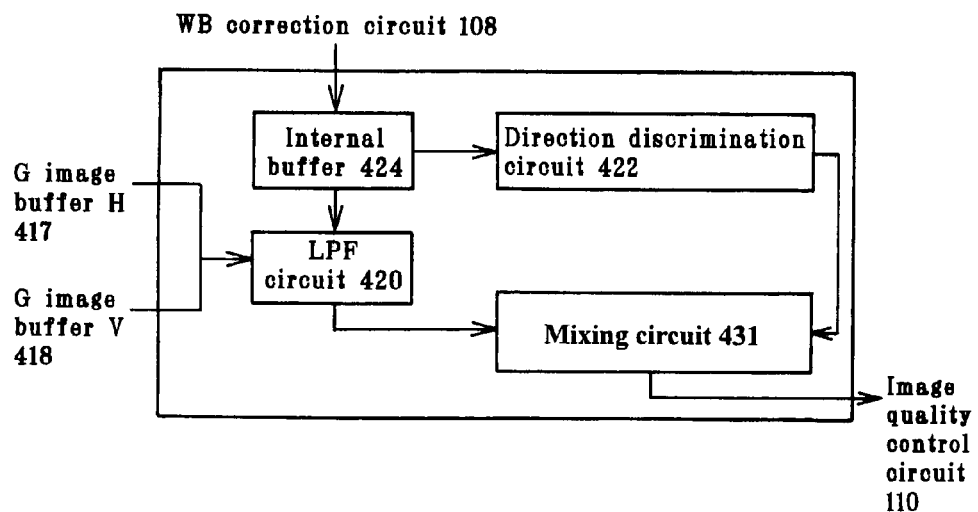
FIG. 27 is illustrative of the architecture of the RB interpolation circuit 409 in a modification to the fourth embodiment.

FIGS. 15-18 are illustrative of the third embodiment of the present invention. FIG. 15 is illustrative of the architecture of the third embodiment; FIG. 16 is illustrative of the architecture of a G interpolation circuit 306; FIG. 27 is a flowchart of RAW development software corresponding to the third embodiment; and FIG. 18 is representative of the characteristics of a filter used with a level difference detection circuit 320. The third embodiment is directed to a digital camera, as is the case with the first embodiment. In FIG. 15, a digital camera 300 of the third embodiment is the same in construction and operation as the digital camera 100 of the first embodiment except that the G interpolation circuit 106 is changed to the G interpolation circuit 306. Like components in FIG. 2 are indicated by like numerals, and there is no detailed reference to them.

FIG. 16 is illustrative of the architecture of the G interpolation circuit 306 that comprises two kinds of interpolation circuits A113 and B114, internal buffers A317 and B318 with their respective outputs held, a level difference detection circuit 320 and a selection circuit 319. The level difference detection circuit 320 and the selection circuit 319 receive the outputs of the internal buffers A317 and B318, and the level difference detection circuit 320 enters its output in the selection circuit 319 while the selection circuit 319 enters its output in the G image buffer 107. Of these components, the interpolation circuits A113 and B114 operate as do those of the first embodiment.

The operation of the digital camera 300 is now explained. Besides the G interpolation circuit 306, the digital camera 300 is the same in construction and operation as the digital camera 100; in what follows, the G interpolation circuit 306 alone will be explained. FIG. 17 is a flowchart of processing at the G interpolation circuit 306. As is the case with the G interpolation circuit 106 in the first embodiment, the G interpolation circuit 306 applies processing to a one-chip image in the one-chip image buffer 104 to generate in the G image buffer 107 an image with a missing G component compensated for throughout pixels. Unlike the first embodiment, however, there is an internal buffer provided so that once two kinds of results of interpolation of the G component over the whole one-chip image in the one-chip image buffer 104 are generated in the buffer, which of the two kinds of results of interpolation is to be selected for each pixel is judged to generate a final output. In what follows, the flowchart of FIG. 17 will be explained.

Step 40: Each pixel of the image in the one-chip image buffer 104 is scanned first in a horizontal direction and then in a vertical direction to extract an unprocessed pixel P. And then, a neighboring 5×5 block around the unprocessed pixel P is read. Hereinafter, this block will be designated as X.

Step 41: The interpolation circuit A113 applies to X the same processing as that at Step 1 of the flowchart of FIG. 5 in the first embodiment. And then, a result V1 is written in a pixel position corresponding to P in the internal buffer A317.

Step 42: The interpolation circuit B114 applies to X the same processing as that at Step 2 of the flowchart of FIG. 5 in the first embodiment. Therefore, the coefficient C_i,j of the linear filter is equivalent to the "coefficient". And then, the result V2 of processing is written in a pixel Q at a pixel position corresponding to P in the internal buffer B318.

Step 43: As the above processing of all pixels in the one-chip image buffer 104 is over, Step 44 takes over. If not over yet, Step 40 is resumed. Through the foregoing processing, two kinds of results of interpolation of the G component by the interpolation circuits A113 and B114 for all pixels in the one-chip image buffer 104 are obtained in the internal buffers A317 and B318.

Step 44: Then, the G interpolation circuit 307 scans the internal buffer A317 to identify one of pixels P that are not subjected to the processing to be described later, thereby reading a neighboring M×M block around it. At the same time, a neighboring M×M block around a pixel Q corresponding to the pixel position of P is read out of the internal buffer B318, too. Here M is an integer of 7 or greater. Hereinafter, the neighboring blocks around P and Q will be called Na and Nb, respectively.

Step 45: At the difference level detection circuit 320, a level difference quantity between Gr and Gb pixels in the read neighboring block Na is judged depending on to what degree a Nyquist frequency component is contained in the neighboring block. To this end, the level difference detection circuit 320 has in it a filter coefficient of M×M magnitude with such horizontal and vertical frequency characteristics as shown in FIG. 18. And then, this filter is applied to Na to find the absolute value of output as an estimated level difference quantity value F, and the intensity of amplitude at the Nyquist frequency at a pixel position P is estimated.

Step 46: When the estimated level difference quantity value F is greater than a threshold value T preset in the level difference quantity detection circuit 320, that circuit 320 judges it to be less than a level where there is a noticeable level difference near the pixel P to enter 1 in the selection circuit 319. On the other hand, when the estimated level difference quantity value F is less than the preset threshold value T, that circuit enters 0 in the selection circuit 319.

Step 47: Upon entrance of 1 from the level difference detection circuit 320, the selection circuit 319 reads the center pixel value (of interest) of pixel P out of the internal buffer A317 to obtain the final result of interpolation, V3, at a pixel position corresponding to pixel P of the image in the one-chip image buffer 104.

Step 48: On the other hand, upon entrance of 0 from the level difference detection circuit 320, the selection circuit 319 reads the center pixel value (of interest) of pixel Q out of the internal buffer B318 to obtain the final result of interpolation, V3, at a pixel position corresponding to pixel P of the image in the one-chip image buffer 104. Step 49: And then, the final result of interpolation, R3, is written in a pixel position corresponding to pixel P in the G image buffer 107. Step 50: As the processing from Step 44 to Step 49 is over for all pixels in the internal buffer A317, it means that the whole processing by the G interpolation circuit 306 is over. If the whole processing is not over, Step 44 is resumed for the repetition of loop processing of Step 44 to Step 50.

Similar processing to that by the G interpolation circuit 306 may just as easily be run on software. To this end, in the flowchart of FIG. 10, the processing from Step 9 to Step 12 may be replaced by processing from Step 40 to Step 50 in FIG. 17, and the processing at Step 50 may be taken over to the processing at Step 13 in FIG. 10.

Two kinds of interpolation circuits A113 and B114 in FIG. 16 are equivalent to the "multiple interpolation means", and the selection circuit 319 is equivalent to the "mixing means". That selection circuit 319 ("mixing means") is adapted to select either one of the results of interpolation by two kinds of interpolation circuits A113 and B114, so having "selection means for selecting either one of results of multiple interpolations". Further, the level difference detection circuit 320 is equivalent to the "control means". Note here that the level difference detection means 320 is also equivalent to the "sensitivity difference measurement means for measuring a sensitivity difference quantity remaining in results of multiple interpolations".

Figure 19:
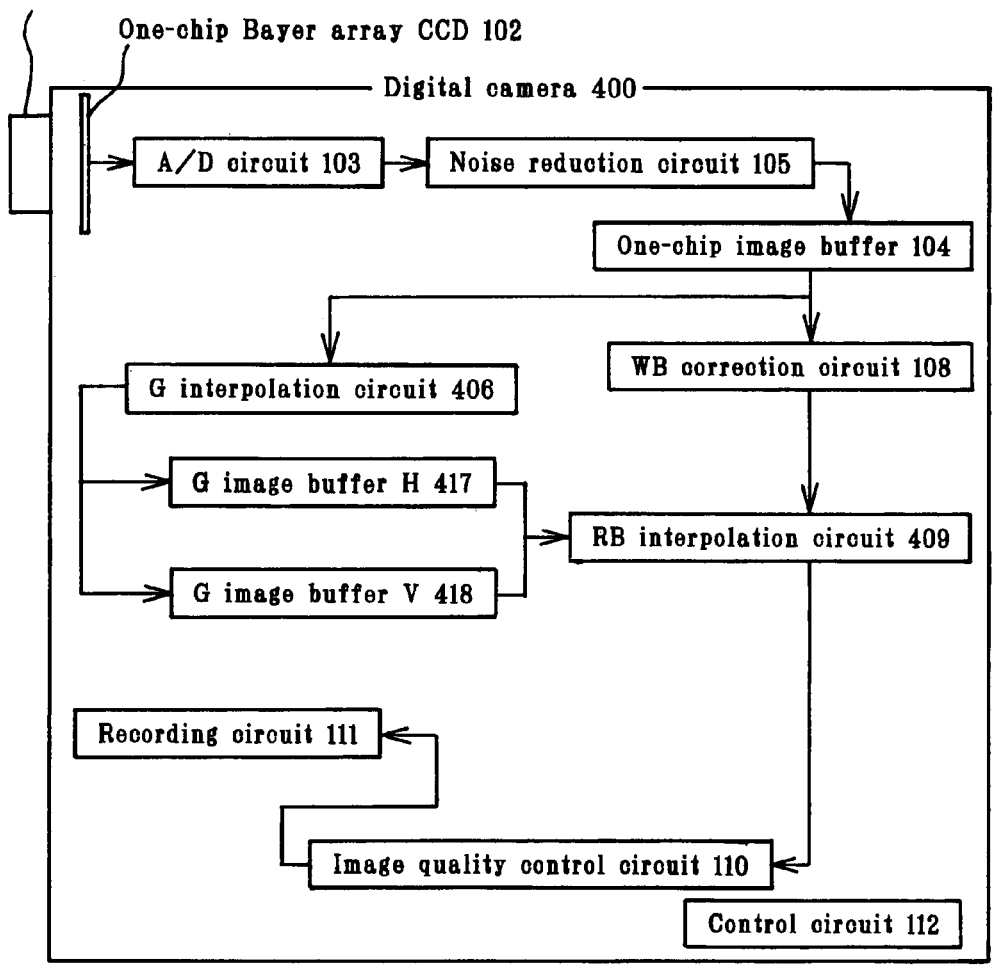
FIG. 19 is illustrative of the architecture of the fourth embodiment.
Figures 20, 21:
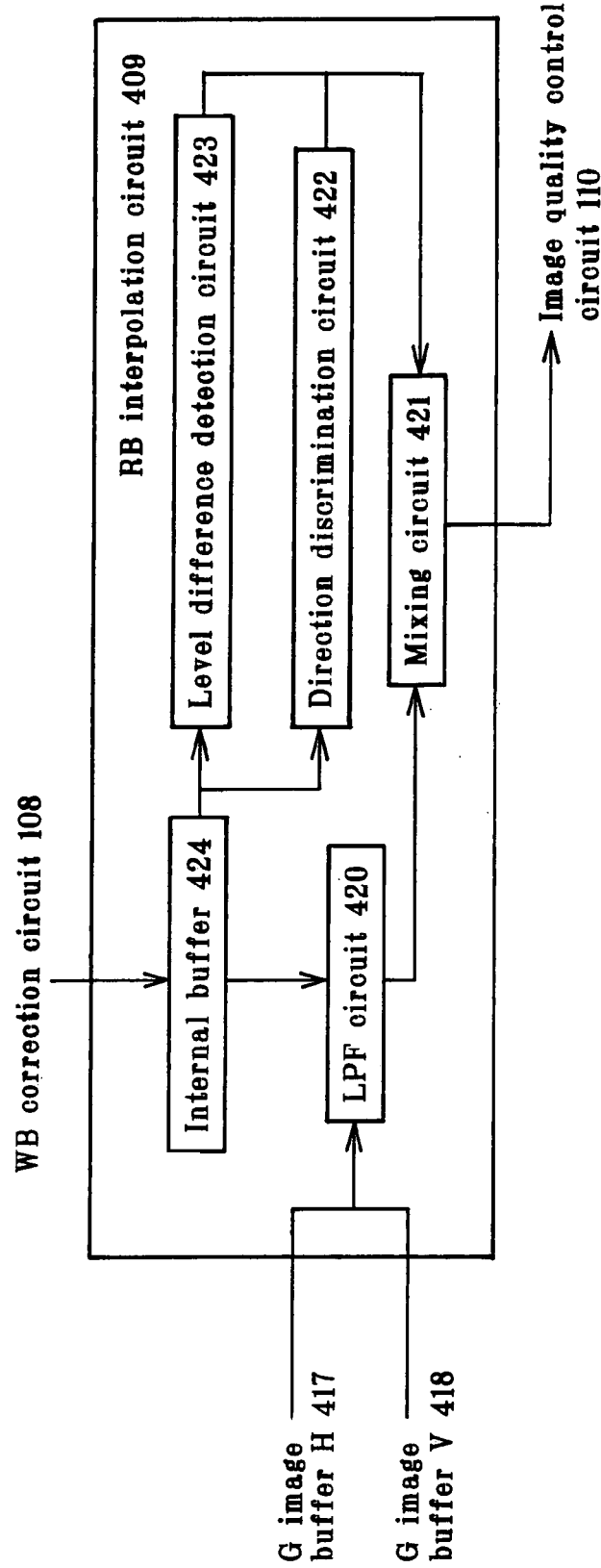
FIG. 20 is illustrative of the architecture of the RB interpolation circuit 409.
FIG. 21 is illustrative of how to implement interpolation by the G interpolation circuit 406.
Figure 22:
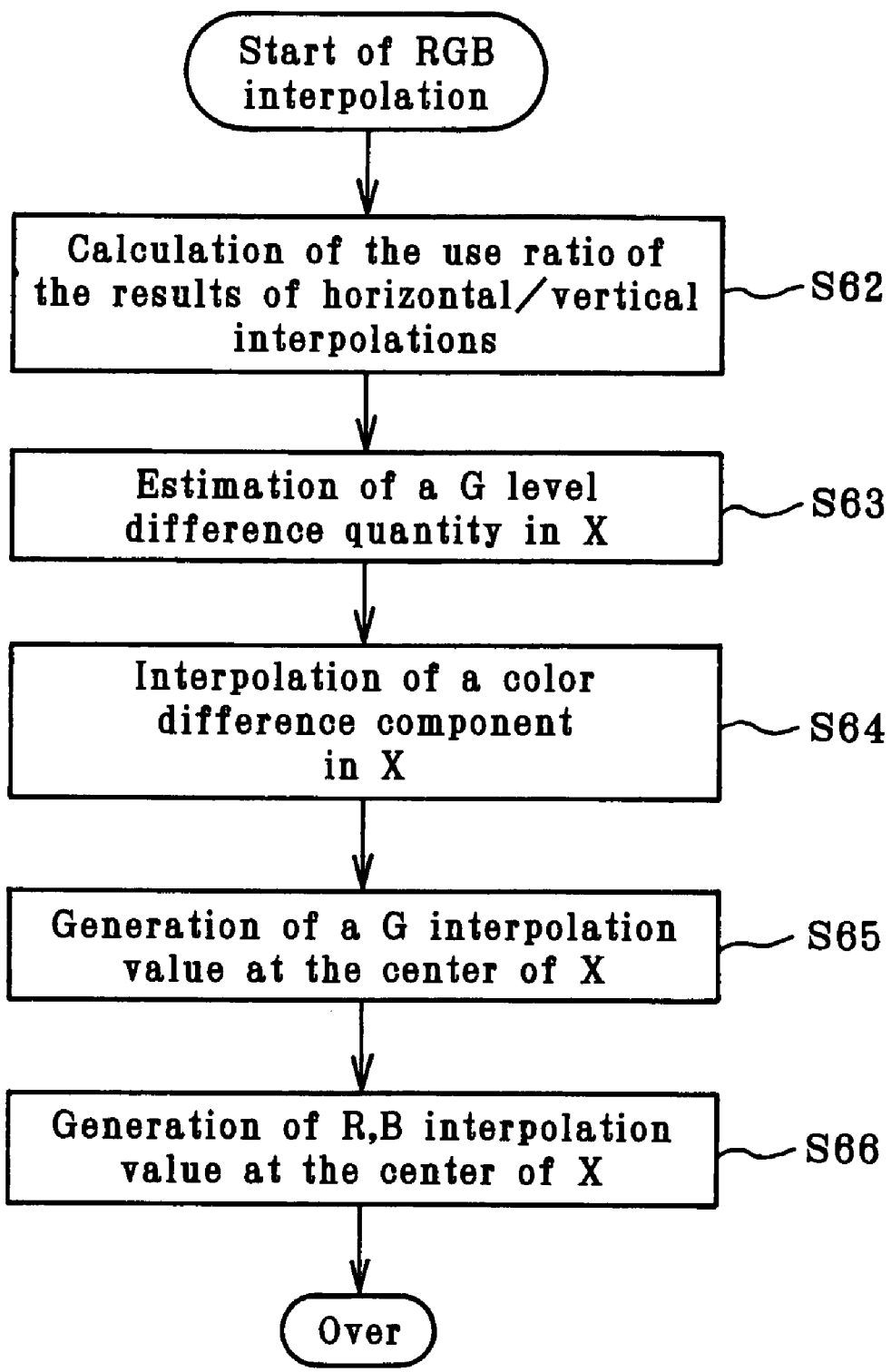
FIG. 22 is a flowchart of processing at the RB interpolation circuit 409.
Figures 23A, 23B, 23C:
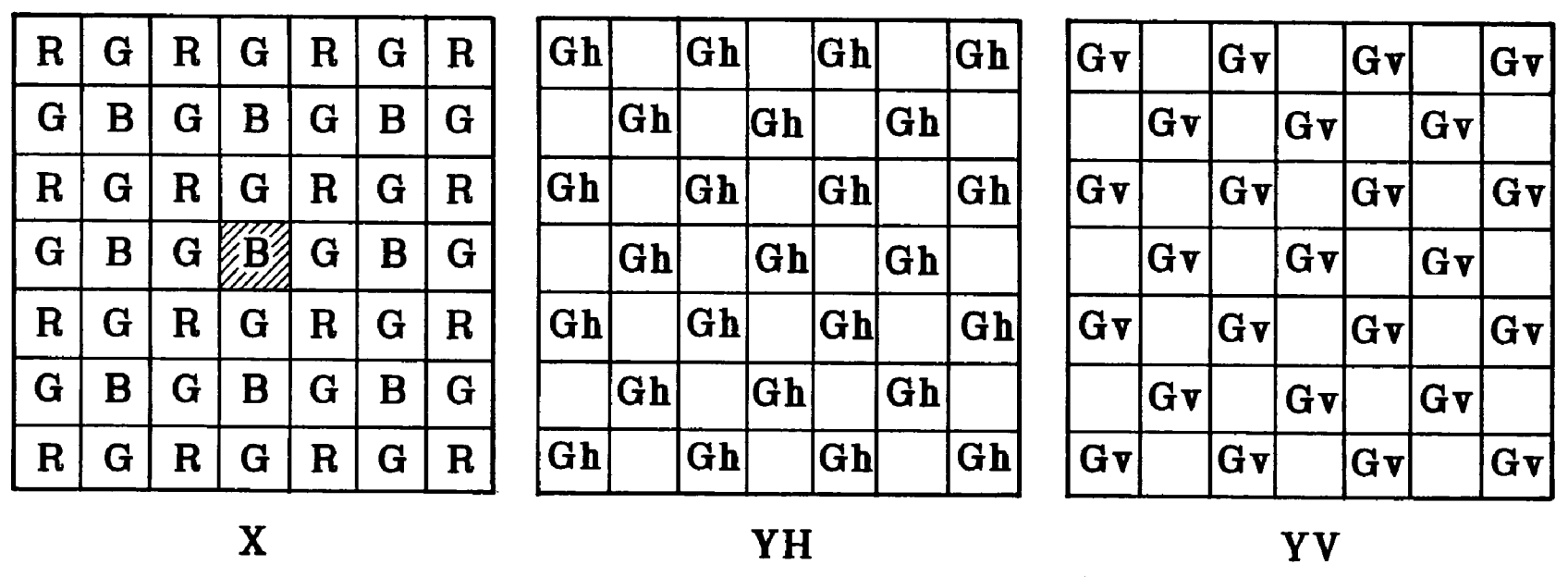
Figure 25:
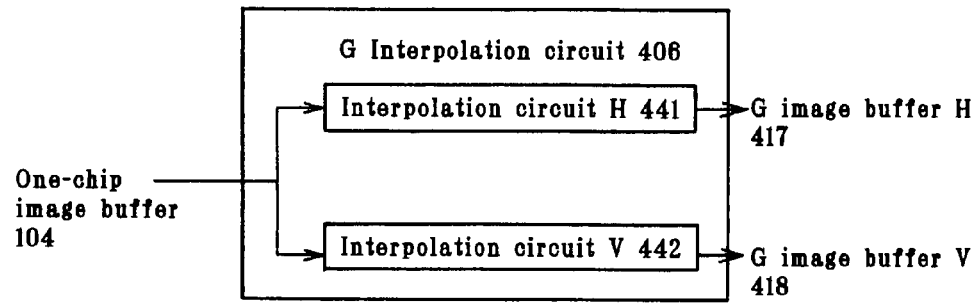
FIG. 25 is illustrative of the architecture of the G interpolation circuit 406.

FIGS. 19-25 and FIG. 27 are illustrative of the fourth embodiment of the present invention. FIG. 19 is illustrative of the architecture of the fourth embodiment; FIG. 20 is illustrative of the architecture of an RB interpolation circuit 409; FIG. 21 is illustrative of how to interpolate by a G interpolation circuit 406; FIG. 22 is a flowchart of processing by the RB interpolation circuit 409; FIG. 23 is representative of data used with the RB interpolation circuit 409; FIG. 24 is representative of the characteristics of a filter used with an LPF circuit 420; FIG. 25 is illustrative of the architecture of the G interpolation circuit 406; and FIG. 24 is illustrative of the architecture of the RB interpolation circuit 402 in a modification to the fourth embodiment.

The embodiment here is directed to a digital camera, as is the case with the first embodiment. A digital camera 400 differs from the digital camera 100 (FIG. 2) according to the first embodiment in that there is the G interpolation circuit 406 provided in place of the G interpolation circuit 106, a G image buffer H417 and a G image buffer V418 provided in place of the G image buffer 104, and the RB interpolation circuit 409 provided in place of the RB interpolation circuit 109; it is otherwise the same in construction and operation as the digital camera 100. Like components in FIG. 2 are indicated by like numerals, and there is no detailed reference to them.

Having such architecture as shown in FIG. 25, the G interpolation circuit 406 comprises the interpolation circuits H441 and V442. The interpolation circuit H441 enters its output in the G image buffer H417, and V442 enters its output in the G image buffer V418. Having such architecture as shown in FIG. 20, the RB interpolation circuit 409 comprises an internal buffer 424 for holding an output from the WB correction circuit 108, an LPF circuit 420 for receiving outputs from the G image buffer H417, the G image buffer V418 and the internal buffer 424, and a level difference quantity estimation circuit 423 and a direction discrimination circuit 422 connected to the internal buffer 424. The RB interpolation circuit 409 also comprises a mixing circuit 421 connected to the direction discrimination circuit 422, the internal buffer 424, the G image buffer H417, the G image buffer V418, the LPF circuit 420 and the image quality control circuit 110. In what follows, the operation of the embodiment here will be explained.

The processing from a shutter (not shown) being pressed down until a one-chip state digital image having only one kind of color component per pixel being entered as output in the one-chip image buffer 104 is not explained because of being the same as in the first embodiment. Thereafter, the G interpolation circuit 104 applies the following operation to each pixel of an image in the one-chip image buffer 104. First, the kind of a color component obtained at each pixel in the one-chip image buffer 104 is examined. And then, when the obtained color component is G, the processing to that pixel is skipped to move it to the next pixel.

When the obtained color component is B, a neighboring 3×3 block is read. And then, the interpolation circuit H441 calculates an average Gh of neighboring pixels on the left and right of a center pixel P, and the interpolation circuit H442 calculates an average Gv of neighboring pixels above and below. For instance, when the neighboring 3×3 block is that shown in FIG. 21, Gh and Gv are found from equation (10)

$$Gh=(Gr0+Gr1)/2$$

$$Gv=(Gb0+Gb1)/2 \quad (10)$$

And then, Gh is written in an address corresponding to P in the G image buffer H417, and Gv is written in an address corresponding to P in the G image buffer V418.

In parallel with the processing implemented by the G interpolation circuit 406, the WB correction circuit 108 reads pixels from the one-chip image buffer 104 on one-by-one basis. When the obtained color component is R or B, a pixel value is multiplied by the gain necessary for white balance before it is entered in the internal buffer 424 in the RB interpolation circuit 409, and when the obtained color component is G, a pixel value is directly entered in the internal buffer 424 in the RB interpolation circuit 409. As the processing by the WB correction circuit 108 and the G interpolation circuit 406 of all pixels in the one-chip image buffer 104 is over, there is a one-chip image after WB correction obtained in the internal buffer 424. Hereinafter, this image will be indicated by Z. Obtained in the G image buffer H417 and the G image buffer V418 are the horizontal and vertical values of interpolation of the G component at R and B pixel positions of Z. Based on these data, the RB interpolation circuit 409 applies interpolation processing to the neighboring block around each pixel of Z on the following principles. And then, the obtained RGB three color components are successively entered in the image quality control circuit 110.

(1) First, horizontal and vertical color difference signals R-G and B-G are created at an R or B pixel position, and the result is interpolated to obtain horizontal and vertical color difference signals at the center pixel in the neighboring block. (2) Then, horizontal and vertical color differences are mixed depending on the direction of an edge in the neighboring block to make an estimation of a color difference component of the center pixel in the neighboring block. (3) Further, the G component of the center pixel in the neighboring block is estimated, and the color difference component obtained at (2) is added up to the result of estimation to obtain the final R and B components. (4) In the embodiment here, thanks to the characteristics of the one-chip Bayer array CCD 102, there is a sensitivity difference (G level difference) occurring between G pixels in different rows or columns. FIG. 28 provides an illustration of, when there is a G level difference occurring by processing at (1), what color difference signal is obtained at a flat portion. FIG. 28(*a*) is representative of one-chip data at a time when a flat gray subject is taken. Due to an apparent sensitivity difference, Gr and Gb pixels have different values. As the processing of (1) is applied to such one-chip data (FIGS. 28(*b*) and 28(*c*)), a different value occurs finally between a horizontal color difference component and a vertical color difference component, albeit being the flat portion, as shown in FIGS. 28(*d*) and 28(*e*). Still, the difference is kept constant regardless of where there are pixels.

Thus, as the processing of (1) is implemented as such when there is a G level difference, there is an influence on the low frequency components of the horizontal and vertical color difference components. And then, as the processing of (2) is further implemented in this state, the mixing ratio fluctuates with the direction of the edge in the neighboring block or the direction of gradation. That fluctuation in turn causes the influence occurring in the low frequency components of the color difference components to change from place to place, resulting in color variations. Thus, as the processing from (1) to (3) is implemented with nothing added to them in the case where there is a G level difference, the influence of the level difference is carried over to the result of interpolation, which then appears in the form of color variations. At the RB interpolation circuit 409, therefore, the G level difference quantity in the neighboring block is so estimated that the influence of the level difference is eliminated by changing an interpolation method on the basis of the estimated level difference quantity. Specifically, the horizontal and vertical color difference components are divided into high frequency components and low frequency components, respectively, so that the high frequency components are mixed at a mixing ratio based on the direction of the edge in the neighboring block. Of the low frequency components, on the other hand, the mixing ratio is let variable depending on the level difference quantity, so that when the level difference quantity is small, they are mixed at the same mixing ratio as that of the high frequency components, and when the level difference quantity is large, they are controlled such that a uniform mixing ratio is reached regardless of direction.

In the fourth embodiment, the interpolation circuits H441 and V442 are equivalent to the "interpolation means"; the mixing circuit 421 is equivalent to the "mixing means"; the level difference quantity estimation circuit 423 and the direction discrimination circuit 422 are equivalent to the "control means"; the level difference quantity estimation circuit 423 is equivalent to the "sensitivity variable estimation means"; the mixing circuit 421 is equivalent to the "weighted average means"; and the direction discrimination circuit 422 is equivalent to the "direction discrimination means".

Specific processing steps based on the above principles are illustrated in the flowchart of FIG. 22. In what follows, each step will be explained. Before staring the processing of the flowchart, the RB interpolation circuit 409 reads a neighboring N×N block around a pixel Q of interest from the internal buffer 424. N is a given integer. Hereinafter, the read neighboring block data will be called X. The results of G interpolation of pixel positions corresponding to R and B pixels contained in X are read from each of the G image buffers H417 and V418, too. These data will be called YH and YV, respectively.

FIG. 23 is illustrative of specific examples of data X, YH, and YV in the case of N=7. Blank pixels show that there are no data obtained. There are other possible data patterns wherein a shaded center pixel in X is R, and G; however, the processing is the same. Therefore, the processing of the flowchart will be explained only with reference to the pattern shown in FIG. 23.

Step 62: The mixing ratio of horizontal and vertical color difference components at (2) is calculated by the direction discrimination circuit 422. At the direction discrimination circuit 422, first, G components of X are filtered by the band-pass filter F1 for the detection of a horizontal edge and a band-pass filter F2 for the detection of a vertical edge to obtain results Dh and Dv. How to calculate and the frequency characteristics of F1 and F2 are the same as those at Step 34 in FIG. 13 in the second embodiment. Then, the direction discrimination circuit 422 uses Dh and Dv to calculate the use factor $\beta$ of the result of horizontal interpolation and the use factor $\gamma$ of the result of vertical interpolation from equation (11)

$$\beta = Dv/(Dh+Dv)$$

$$\gamma = Dh/(Dh+Dv) \quad (11)$$

And then, the results are entered in the mixing circuit 421.

Step 63: At Step (4), it is the level difference quantity estimation circuit 423 that determines a ratio $\alpha$ at which the result of interpolation affected by the level difference is mixed with the result of interpolation unaffected by the level difference. As is the case with Step 3 of FIG. 5 in the first embodiment, the level difference quantity estimation circuit 423 has in an internal ROM a table that associates R and B pixel values in the neighboring block with a generated G level difference quantity. And then, averages R' and B' of R pixels and B pixels contained in X, respectively, are worked out, and these averages are used as indices to have access to the table to find a G level difference quantity F. Then, reference is made to a table that associates the G level difference quantity F with the mixing ratio $\alpha$ to enter the final mixing ratio $\alpha$ in the mixing circuit 421. This table is likewise given to the ROM, having preferably such characteristics as shown in FIG. 7.

Step 64: After the completion of the foregoing processing, color differences R-G and B-G at the center of the neighboring block are estimated. To this end, first, the LPF circuit 420 applies the following filtering to the data X, YH and YV. In what follows, F3, F4 and F5 will each be indicative of a linear filter of the same size as X, YH and YV, with its coefficient value held in the internal ROM in the LPF circuit 420.

First, in the horizontal and vertical directions, the low-pass filter F3 having frequency characteristics as indicated by characteristics A in FIG. 24 is applied to YH and YV to obtain Gh1 and Gv1. Because at YH, and YV, only partial data are obtained, normalization is implemented for filtering. A specific calculation formula, for instance, for GH1 is given by $$Gh1 = (\Sigma F3\_k,l\, YH(k,l))/\Sigma F3\_k,l \quad (12)$$

In the formula, F3_k,i stands for the coefficient of the filter F3, and YH(k,l) is indicative of a pixel value at coordinates (k,l) for YH while, with respect to both the denominator and the numerator, sums are taken of all integer sets (k,l) standing for coordinates for pixel positions with data obtained at YH.

Then, in the horizontal and vertical directions, the low-pass filter F4 having frequency characteristics as indicated by characteristics B in FIG. 24 is applied to YH and YV to obtain Gh2 and Gv2. How to calculate is similar to that represented by formula (12). Further, the low-pass filter F4 is applied to R and B components of X, too, to obtain R2 and B2. A calculation formula is given by formula (13) in place of formula (12)

$$R2 = (\Sigma F4\_k,l\, X(k,l))/\Sigma F4\_k,l$$

$$B2 = (\Sigma F4\_s,t\, X(s,t))/\Sigma F4\_s,t \quad (12)$$

In the formula, X(k,l) refers to an pixel value at coordinates (k,l) for X, and in the formula for R2, with respect to both the denominator and the numerator, sums are taken of all integer sets (k,l) indicative of coordinates at an R pixel position in X. Similarly in the formula for B2, with respect to both the denominator and the numerator, sums are taken of all integer sets (s,t) indicative of coordinates at a B pixel position in X.

Upon completion of the foregoing processing, the LPF circuit 420 enters the results Gh1, Gh2, Gv1, Gv2, R2 and B2 in the mixing circuit 421. At the mixing circuit 421, based on the entered data, color difference components R-G and B-G at the center pixel in X are found in the following manner. First, color difference components Cr1 and Cb1 remaining unaffected by the G level difference are calculated from the following formula (14)

$$Cr1 = R2 - \beta^*(Gh2-Gh1) - \gamma^*(Gv2-Gv1) - (Gh1+Gv1)/2$$

$$Cb1 = B2 - \beta^*(Gh2-Gh1) - \gamma^*(Gv2-Gv1) - (Gh1+Gv1)/2 \quad (14)$$

Then, color difference components Cr2 and Cb2 including the influences of the G level difference are calculated from formula (15)

$$Cr2 = R2 - \beta^*Gh2 - \gamma^*Gv2$$

$$Cb2 = B2 - \beta^*Gh2 - \gamma^*Gv2 \quad (15)$$

Finally, the color difference components remaining unaffected by the G level difference and the color difference components including the influences of the G level difference are combined to calculate the final color difference from formula (16)

$$Cr = \alpha^*Cr2 + (1-\alpha)^*Cr1$$

$$Cb = \alpha^*Cb2 + (1-\alpha)^*Cb1 \quad (16)$$

The processing of Step 64 is equivalent to the requirement recited in claim 10. That is, the "results of multiple interpolations" recited in claim 10 are equivalent to Gh and Gv in formula (10); the "multiple frequency components" are equivalent to Gh1 and Gv1 in formula (12) and Gh2−Gh1 and Gv2−Gv1 in formula (14); and the "weight differing for each frequency component" is equivalent to the coefficient ½ for Gh1 and Gv1 in formula (14), and $\beta$ for Gh2−Gh1 and $\gamma$ for Gv2−Gv1 in formula (14).

Step 65: After the color difference is estimated by the mixing circuit 421, the LPF circuit 420 applies a low-pass filter F5 to the G component in X to make an estimation of the value G0 of the center pixel in X, entering it in the mixing circuit 421. F5 has such frequency characteristics as represented by C in FIG. 24 in the horizontal and vertical directions. A calculation formula for G0 is given by formula (17)

$$G0=(\Sigma F5\_k,l\,X(k,l))/\Sigma F5\_k,l \quad (17)$$

In the formula, X(k,l) is indicative of a pixel value at coordinates (k,l) for X, and with respect to both the denominator and the numerator, sums are taken of all integer sets (k,l) representative of coordinates for G pixel positions in X.

Step 66: Finally, the mixing circuit 421 calculates the values R0 and B0 of the R and B components of the center pixel in X from equation (18)

$$R0=Cr+G0$$

$$B0=Cb+G0 \quad (18)$$

And then, the obtained RGB three-color component (R0, G0, B0) is entered in the image quality control circuit 110.

As the processing by the RB interpolation circuit 409 of all pixels in the internal buffer 424 is over, it means that a color image with a missing color component compensated for per pixel in the one-chip image buffer 104 is entered in the image quality control circuit 110. The subsequent processing is the same as in the first embodiment. Note here that processing similar to the embodiment here may just as easily be run on software for the development of a RAW data file. Specifically, the buffer 3 plus a buffer 4 are added to the flowchart of FIG. 10 with some modifications to a specific step.

Figure 30:
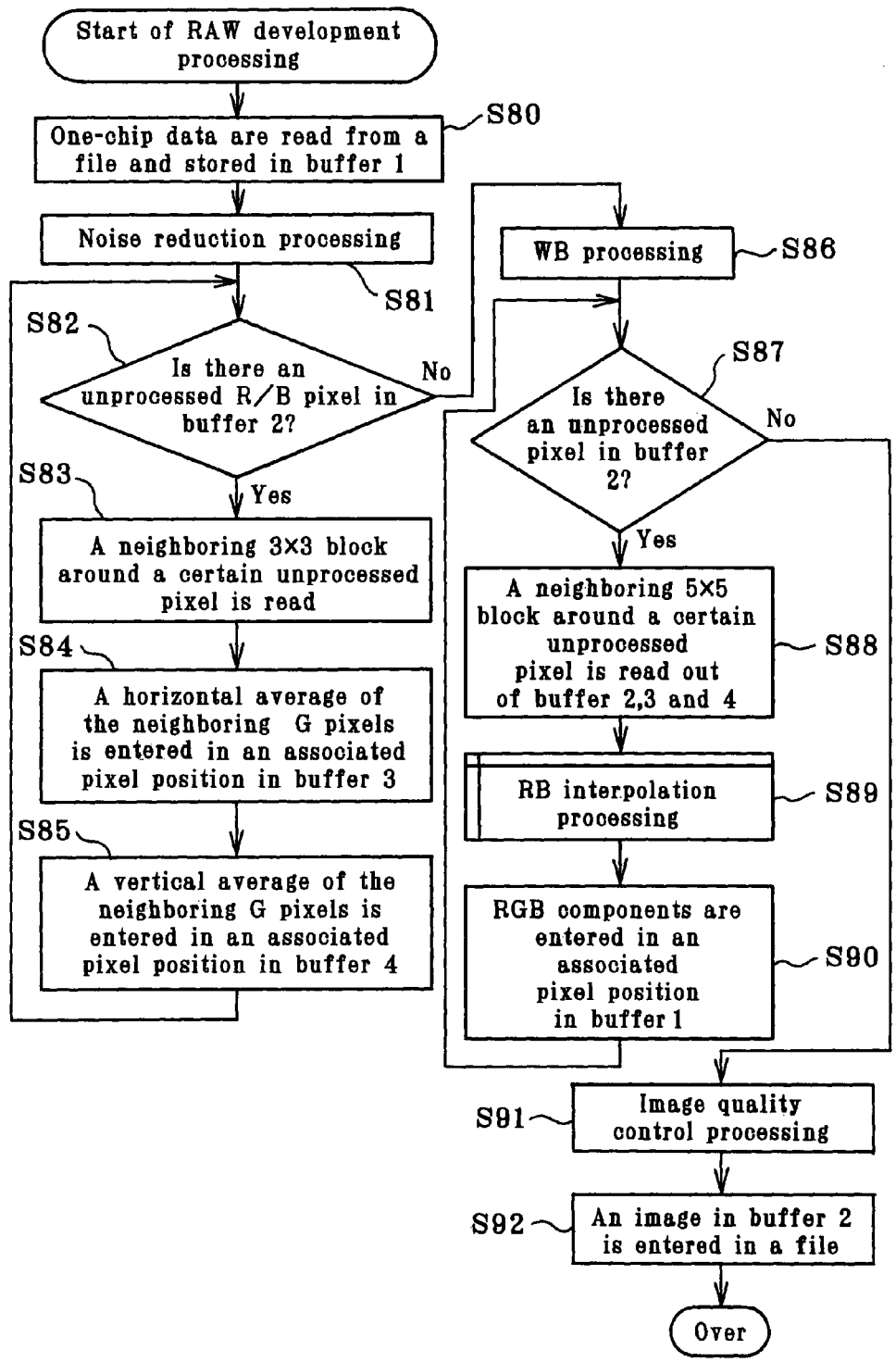
FIG. 30 is a flowchart for the fourth embodiment.

FIG. 30 is a flowchart after there are some modifications made. Each step of the flowchart is now explained. Step 80 is the same as Step 7 in FIG. 10, and Step 81 is the same as Step 8 in FIG. 10. Step 82: At R or B pixel positions, whether or not there is an unprocessed pixel is searched. If the unprocessed one is found out, processing moves to Step 83, and if not, processing moves to Step 86. Step 83: A neighboring 3×3 block around the unprocessed pixel is read out. Step 84: In the read neighboring block, an average value Gh of G pixels adjacent to the center pixel in the horizontal direction is calculated to enter it in a position corresponding to a pixel of interest in the buffer 3. Step 85: In the read neighboring block, an average value Gv of G pixels adjacent to the pixel of interest in the vertical direction is calculated to enter it in a position corresponding to a pixel of interest in the buffer 4. At Steps 84 and 85, for instance, when the neighboring block is the one shown in FIG. 21, there is a calculation formula given by formula (10). Step 86 is the same as Step 13 in FIG. 10. Step 87: A pixel not subjected to the processing from Step 87 to Step 90 is searched out of the buffer 2. If found out, processing moves to Step 88, and if not, processing moves to Step 91. Step 88: A neighboring N×N block around a pixel position corresponding to an unprocessed pixel in the buffer 2 (hereinafter called Q) is read out, where N is a given integer. Hereinafter, the data will be called X. A neighboring N×N block around a pixel position corresponding to Q is read out of each of the buffers 3 and 4, too. Hereinafter, the data will be called YH and YB, respectively. Step 89: The RB interpolation processing shown in the flowchart of FIG. 22 is implemented. Step 90: An RGB value that is the result of Step 89 is written in a pixel position corresponding to Q in the buffer 1. Step 91 is the same as Step 18 in FIG. 10, and Step 92 is the same as Step 19 in FIG. 10.

In the embodiment here, processing is implemented for each level difference quantity judged per pixel. However, there is one possible modification wherein, as shown in FIG. 27, to keep any failure at bay whatever level difference there may be, only interpolation processing designed to be not affected by that level difference is implemented. FIG. 27 is illustrative of the architecture of an RB interpolation circuit 409 in that modification. As can be seen from a comparison with the architecture of FIG. 20, the level difference quantity estimation circuit 423 is removed off. There is also a mixing circuit 431 provided in place of the mixing circuit 421. The operation of other circuits is the same as in the fourth embodiment. After the calculation of Cr1, Cb1 and G0 from formula (17), the mixing circuit 431 calculates the final R0 and B0 from equation (19) in lieu of equation (18)

$$R0=Cr1+G0$$

$$B0=Cb1+G0 \quad (19)$$

Consequently, the results of interpolation that are always never affected by the level difference are obtainable.

The structures represented in FIG. 27 are equivalent to those recited in the claims. That is, the interpolation circuits E223 and F224 are equivalent to the "interpolation means for compensating for a missing color component per each pixel of data", and the selection circuit 116 is equivalent to the "mixing means for mixing outputs from said multiple interpolation means". The interpolation means and the mixing means here are "set depending on said sensitivity difference (between pixels with which a specific color component is acquired).

Figure 31:
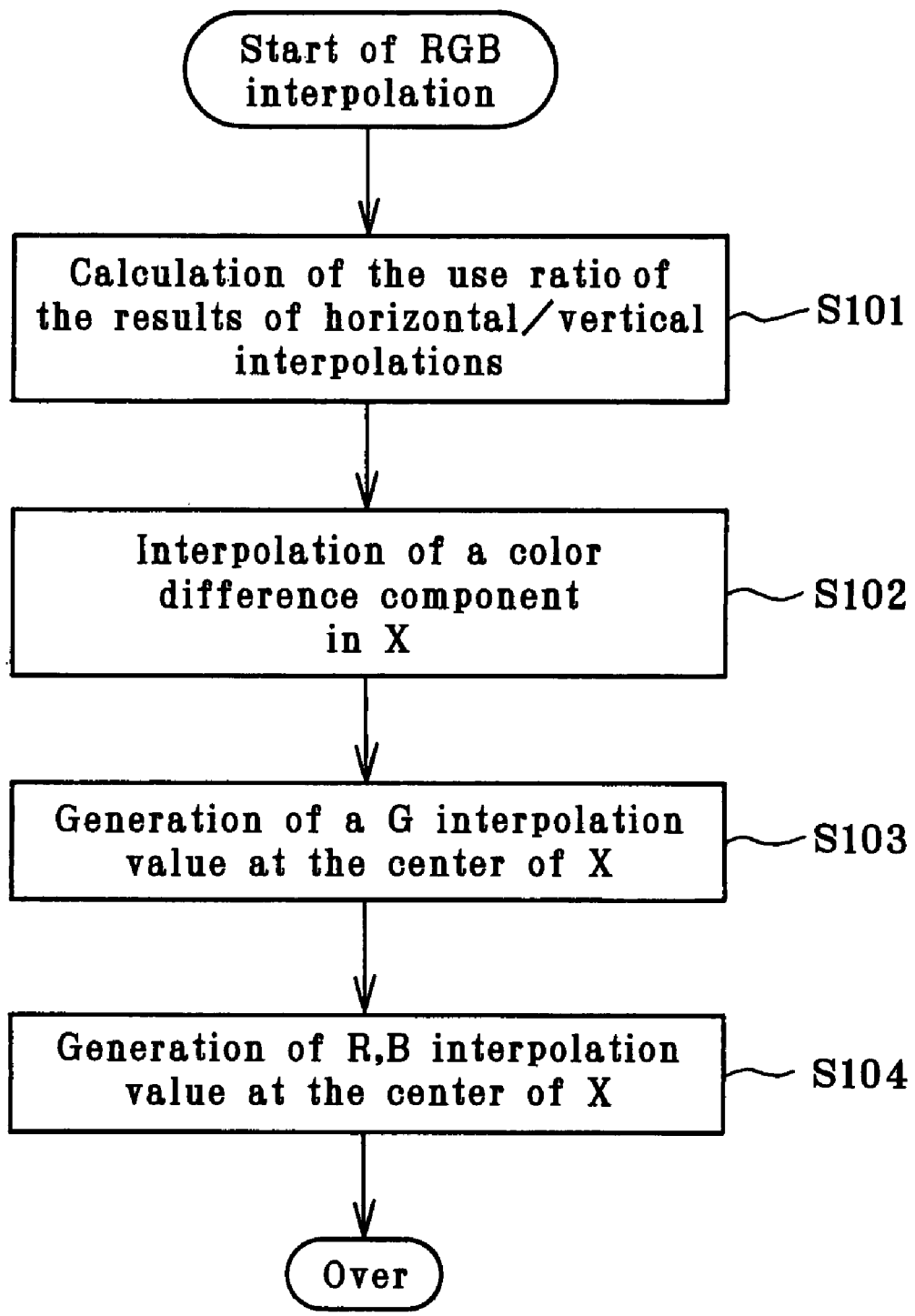
FIG. 31 is a flowchart for a modification to the fourth embodiment.

It is appreciated that the modification illustrated in FIG. 17, too, may just as easily be run on software. What is needed in that case is only to implement the RB interpolation processing at Step 89 in the flowchart of FIG. 30 according to the flowchart of FIG. 31, not the flowchart of FIG. 22. In the flowchart of FIG. 31, Step 63 of the flowchart of FIG. 22 is not implemented; each step is implemented as follows. Step 101 is the same as Step 62 in FIG. 22, and Step 102 is identical with Step 64 in FIG. 22 with the exception that the calculations of formulae (15) and (16) are not implemented. Step 102 is the same as Step 65 in FIG. 22, and Step 104 is identical with Step 66 in FIG. 22 with the exception that the final R and B components are calculated according to equation (19) in place of equation (18).

Reference is now made to how the image processing programs recited in the claims are associated with the embodiments of the present invention. The image processing program is equivalent to the RAW development software recited in the first to the fourth embodiment (FIGS. 5, 10, 13, 17, 22, and 30). The advantage of the image processing program is that the multiple results of interpolation are subjected to the optimum mixing depending on a sensitivity difference so that even when there is a sensitivity difference, interpolation with no failure can be implemented.

The image processing program has such relations to each embodiment as mentioned below.

(a) The whole flowchart of Embodiment 1: At Step 11 of the flowchart of FIG. 10, the processing of the flowchart of FIG. 5 is implemented. The "step of reading data" is equivalent to Step 7 of FIG. 10; the "multiple interpolation processing steps" is equivalent to Step 1 and Step 2 of FIG. 5 in Step 11 of FIG. 10 (the flowchart of FIG. 5); the "output mixing step" is equivalent to Step 5 of FIG. 5 in Step 11 of FIG. 10 (the flowchart of FIG. 5); and the "step of control depending on a sensitivity difference" is equivalent to Step 3 and Step 4 of FIG. 5 in Step 11 of FIG. 10 (the flowchart of FIG. 5).

(b) The whole flowchart of Embodiment 2: In Step 11 (the flowchart of FIG. 13) in the flowchart of FIG. 10, the processing of the flowchart of FIG. 13 is implemented. The "step of reading data" is equivalent to Step 7 of FIG. 10; the "multiple interpolation processing steps" is equivalent to Step 32 and Step 33 of FIG. 13 in Step 11 of FIG. 10 (the flowchart of FIG. 13); the "output mixing step" is equivalent to Step 34, Step 35 and Step 36 of FIG. 13 in Step 11 of FIG. 10 (the flowchart of FIG. 13); and the "step of control depending on a sensitivity difference" is equivalent to Step 30 and Step 31 of FIG. 13 in Step 11 of FIG. 10 (the flowchart of FIG. 13).

(c) The whole flowchart of Embodiment 3: Processing is implemented with Steps 9 to 12 of the flowchart of FIG. 10 changed to the flowchart of FIG. 17. The "step of reading data" is equivalent to Step 7 of FIG. 10; the "multiple interpolation processing steps" is equivalent to Step 41 and Step 42 of FIG. 17; the output mixing means" is equivalent to the Step 46, Step 47 and Step 48 of FIG. 17; and the "step of control depending on a sensitivity difference" is equivalent to Step 45 of FIG. 17.

(d) The whole flowchart of Example 4: In Step 89 of FIG. 30, the processing of the flowchart of FIG. 22 is implemented. The "step of reading data" is equivalent to Step 80 of FIG. 30; the "multiple interpolation processing steps" is equivalent to Step 84 and Step 85 of FIG. 30; the "output mixing step" is equivalent to Step 64 of FIG. 22 in Step 89 of FIG. 30 (the flowchart of FIG. 22); and the "step of control depending a sensitivity difference" is equivalent to Step 63 of FIG. 22 in Step 89 of FIG. 30 (the flowchart of FIG. 22).

The image processing program corresponds to the RAW development software (FIGS. 10, 29, 30, 31) described in the modification to Embodiment 2 and the modification to Embodiment 4. The image processing program is set such that interpolation means and mixing means are adaptive to where there is a sensitivity difference in input data, so that the results of interpolation are obtainable with no failure.

The image processing program has such relations to each embodiment as mentioned below.

Figure 29:
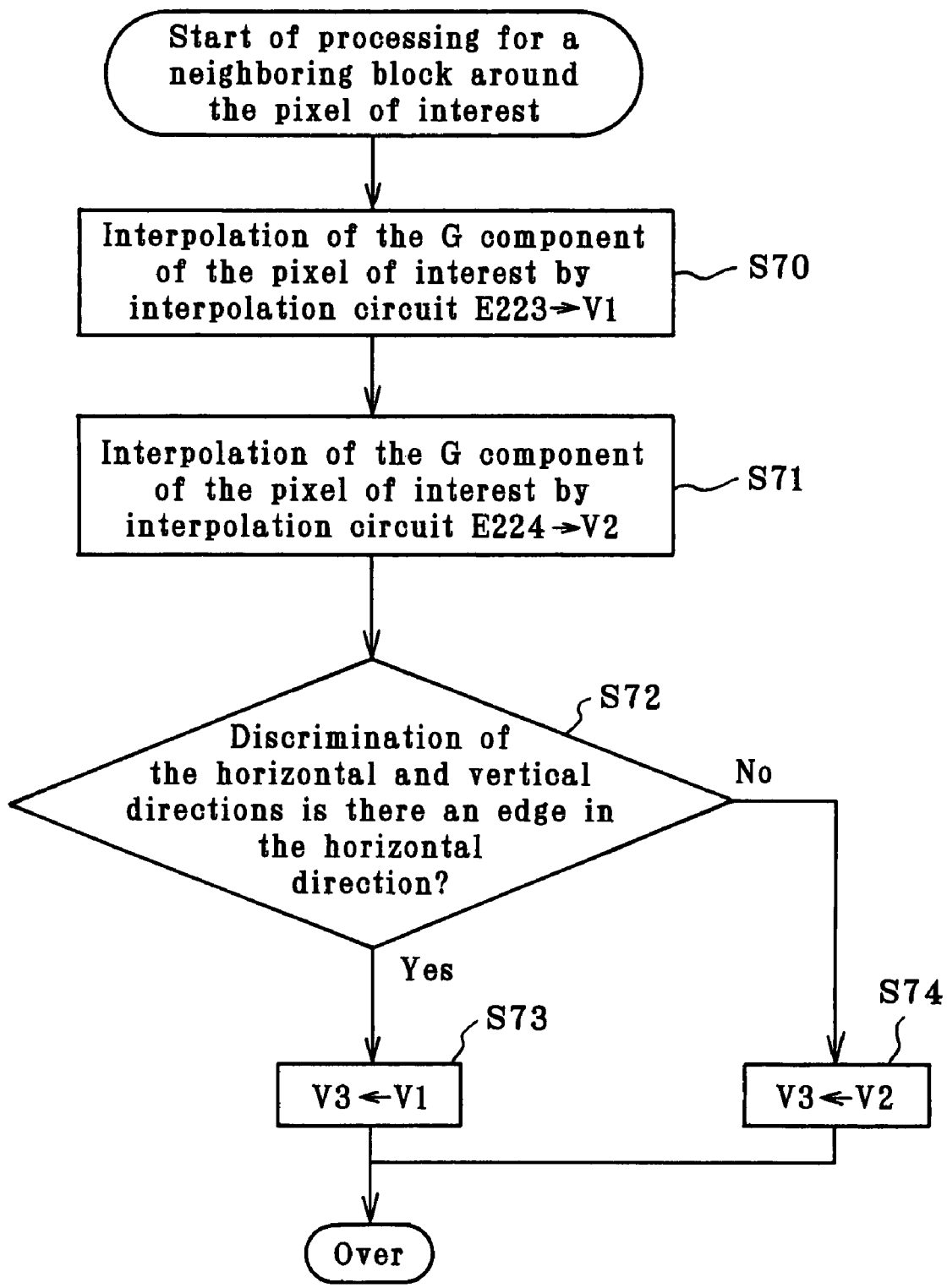
FIG. 29 is a flowchart for a modification to the second embodiment.

(a) The whole flowchart of the modification to Embodiment 2: In Step 11 of the flowchart of FIG. 10, the processing of the flowchart of FIG. 29 is implemented. The "step of reading data" is equivalent to Step 7 of FIG. 10; the "multiple interpolation processing steps" is equivalent to Step 70 and Step 71 of FIG. 29 in Step 11 of FIG. 10 (the flowchart of FIG. 29); and the "output mixing step" is equivalent to Step 72, Step 73 and Step 74 of FIG. 29 in Step 11 of FIG. 10 (the flowchart of FIG. 29).

(b) The whole flowchart of the modification to Embodiment 4: In Step 89 of the flowchart of FIG. 30, the processing of the flowchart of FIG. 31 is implemented. The "step of reading data" is equivalent to Step 80 of FIG. 30; the "multiple interpolation processing steps" is equivalent to Step 84 and Step 85 of FIG. 30; and the output mixing step" is equivalent to Step 102 of FIG. 31 in Step 89 of FIG. 30 (the flowchart of FIG. 31).

The image processing program corresponding to Embodiments 1, 2 and 3, has the following advantages. (a) The control step is such that the filter coefficient is set without having the influences of sensitivity differences on the results of interpolation, so that the results of interpolation with no failure are obtainable even with input data having a sensitivity difference. (b) By removing frequency components caused by a sensitivity difference from the results of interpolation, there is no influence of that sensitivity difference on the results of interpolation.

The image processing program corresponds to Embodiments 1, 2 and 3, but Embodiment 2 is corresponds to the modification shown in FIG. 26. The image processing program has the following advantages: (a) the control step is such that the filter coefficient is set without having the influences of sensitivity differences on the results of interpolation, so that the results of interpolation with no failure are obtainable even with input data having a sensitivity difference, and (b) by removing frequency components given by a sensitivity difference to the results of interpolation, there is no influence of that sensitivity difference on the results of interpolation.

The image processing program corresponding to Embodiments 1 and 2 uses an ordinary sensitivity difference estimation method (as by way of comparison of the values of pixels having the same color component in an image), enabling the image processing program to be best adaptive to the quantity and pattern of a sensitive difference generated inherently in a specific sensor or a specific taking condition. In the image processing program, the "sensitivity difference estimation step" is equivalent to Step 3 of FIG. 5; the "type of an imaging device" is equivalent to the model number of the imaging device in the explanation of Step 8 of FIG. 5; and the "taking condition" is equivalent to the shutter speed in the explanation of Step 3 of FIG. 5.

The image processing program corresponding to Embodiments 1 and 4 has the advantage whereby the results of multiple interpolations are subjected to the best weighted average depending on a sensitivity difference, so that interpolation processing with no failure is achievable even when there is a sensitivity difference.

Reference is here made to in what relations the image processing program is associated with each embodiment. Regarding the "step of implementing weighted average processing", (a) processing is implemented according to the whole flowchart of Embodiment 1; at Step 11 of the flowchart of FIG. 10, the processing of the flowchart of FIG. 5 is implemented, and in Step 11 of FIG. 10 (the flowchart of FIG. 5), Step 5 of FIG. 5 is implemented, and (b) processing is implemented according to the whole flowchart of Embodiment 4; at Step 89 of FIG. 30, the processing of the flowchart of FIG. 22 is implemented; and in Step 89 of FIG. 30 (the flowchart of FIG. 22), Step 64 of FIG. 22 is implemented.

The image processing program performs a process of mixing the results of multiple interpolations depending on an edge direction ensures high-precision interpolation.

Reference is here made to in what relations the image processing program is associated with each embodiment. Regarding the "step of discriminating an edge direction", (a) processing is implemented according to the whole flowchart of Embodiment 2; at Step 11 of the flowchart of FIG. 10, processing is implemented according to the flowchart of FIG. 13, and in Step 11 of FIG. 10 (the flowchart of FIG. 13), processing is implemented according to the flowchart of FIG. 13, and (b) processing is implemented according to the whole flowchart of Embodiment 4; at Step 89 of FIG. 30, processing is implemented according to the flowchart of FIG. 22, and in Step 89 of FIG. 30 (the flowchart of FIG. 22), processing corresponding to Step 62 of FIG. 22 is implemented.

POSSIBLE INDUSTRIAL APPLICATIONS

According to the present invention as described above, there can be an image processor and an image processing program provided, which have high precision yet enable interpolation processing to be implemented with no or little ailment, even when there is a sensitivity variation in a sensor.

I claim:

1. An image processor which processes data produced by an imaging device to acquire a specific color component, said image processor comprising:
multiple interpolation sections which calculate a difference between pixel values of the specific color component in said data and make up for a missing color component in said data based on the calculated difference between pixel values of the specific color component in said data;
a mixing section which mixes outputs from said multiple interpolation sections; and
a control section which controls at least one of said multiple interpolation sections and said mixing section based on a sensitivity difference related to a characteristic of pixels included in said imaging device, said sensitivity difference being different from said difference between pixel values of the specific color component in said data which is calculated by the multiple interpolation sections.

2. The image processor according to claim 1, wherein said control section comprises a sensitivity difference estimation section which estimates the sensitivity difference.

3. The image processing according to claim 2, wherein said sensitivity difference estimation section makes a sensitivity difference estimation based on at least one of a type of said imaging device and a condition under which said data is obtained.

4. The image processor according to claim 1, wherein said mixing section comprises a selection section which selects one of results of multiple interpolations of said multiple interpolation sections, and wherein said control section makes a decision of which one of said results is to be selected by said selection section based on said sensitivity difference.

5. The image processor according to claim 1, wherein said mixing section comprises a weighted average section which applies a weighted average to results of multiple interpolations of said multiple interpolation sections, and wherein said control section makes a decision of a weight of said weighted average section based on said sensitivity difference.

6. The image processor according to claim 1, wherein said mixing section separates each of results of multiple interpolations of said multiple interpolation sections into multiple frequency components, so that after a weighted average with a different weight for each frequency component is calculated, said multiple frequency components are again combined.

7. The image processor according to claim 1, wherein said control section comprises a sensitivity difference measurement section which measures a quantity of a sensitivity difference remaining in a result selected from results of multiple interpolations of said multiple interpolation sections, and wherein said mixing section is controlled based on a result of said measurement.

8. The image processor according to claim 1, wherein said control section comprises a direction discrimination section which judges an edge direction near each pixel of said data, so that said mixing section is controlled based on a result of said direction discrimination.

9. The image processor according to claim 1, wherein at least one of said multiple interpolation sections performs interpolation with a linear filter, and said control section is adapted to set a coefficient of each said linear filter based on said sensitivity difference.

10. The image processing according to claim 9, wherein said coefficient is set such that a degree of amplification of a frequency component in said data, which is caused by said sensitivity difference, is kept within a given range.

11. An image processor which processes data produced by an imaging device to acquire a specific color component, said image processor comprising:
multiple interpolation sections which calculate a difference between pixel values of the specific color component in said data and make up for a missing color component in said data based on the calculated difference between pixel values of the specific color component in said data;
a mixing section which mixes outputs from said multiple interpolation sections,
wherein said multiple interpolation sections and said mixing section are controlled based on a sensitivity difference related to a characteristic of pixels included in said imaging device, said sensitivity difference being different from said difference between pixel values of the specific color component in said data which is calculated by the multiple interpolation sections.

12. The image processor according to claim 11, wherein said mixing section separates each of results of multiple interpolations of said multiple interpolation sections into multiple frequency components, so that after a weighted average with a different weight for each frequency component is calculated, said multiple frequency components are again combined.

13. The image processor according to claim 11, wherein at least one of said multiple interpolation sections performs interpolation with a linear filter, and a coefficient thereof is set based on said sensitivity difference.

14. The image processor according to claim 13, wherein said coefficient is set such that a degree of amplification of a frequency component caused by said sensitivity difference in said data is kept within a given range.

15. A non-transitory computer-readable medium having stored thereon an image processing program that is executable by a computer to process data produced by an imaging device to acquire a specific color component, wherein said program controls the computer to execute processes comprising:
reading, in said computer, the data produced by the imaging device;
performing multiple interpolation processings to calculate a difference between pixel values of the specific color component in said data and make up for a missing color component in said data based on the calculated difference between pixel values of the specific color component in said data;
mixing outputs based on said multiple interpolation processings; and
controlling at least one of said interpolation processings and said mixing based on a sensitivity difference related to a characteristic of pixels included in said imaging device, said sensitivity difference being different from said difference between pixel values of the specific color component in said data which is calculated in the multiple interpolation processings.

16. The computer-readable medium according to claim 15, wherein at least one of said multiple interpolation processings includes interpolation processing with a linear filter, wherein said controlling further comprises setting a coefficient of each said linear filter based on said sensitivity difference, and wherein said coefficient is set such that a degree of amplification of a frequency component in said data, which is caused by said sensitivity difference, is kept within a given range.

17. The computer-readable medium according to claim 15, wherein said controlling further comprises estimating the sensitivity difference of said imaging device based on at least one of a type of said imaging device and a condition under which said data is obtained.

18. The computer-readable medium according to claim 15, wherein said mixing further comprises applying weighted average processing to results of said multiple interpolation processings, and wherein said controlling further comprises making a decision of a weight of said weighted average processing based on said sensitivity difference.

19. The computer-readable medium according to claim 15, wherein said controlling further comprises judging an edge direction near each pixel of said data, and said mixing is controlled based on a result of said edge direction judgment.

20. A non-transitory computer-readable medium having stored thereon an image processing program that is executable by a computer to process data produced by an imaging device to acquire a specific color component, wherein said program controls the computer to execute processes comprising:

reading, in said computer, the data produced by the imaging device;

performing multiple interpolation processings to calculate a difference between pixel values of the specific color component in said data and make up for a missing color component in said data based on the calculated difference between pixel values of the specific color component in said data; and mixing outputs based on said multiple interpolation processings, wherein said multiple interpolation processings and said mixing are controlled based on a sensitivity difference related to a characteristic of pixels included in said imaging device, said sensitivity difference being different from said difference between pixel values of the specific color component in said data which is calculated in the multiple interpolation processings.

21. The computer-readable medium according to claim 20, wherein at least one of said multiple interpolation processings includes interpolation processing with a linear filter, and a coefficient thereof is set based on said sensitivity difference, wherein said coefficient is set such that a degree of amplification of a frequency component in said data, which is caused by said sensitivity difference, is kept within a given range.

* * * * *